United States Patent
Heinrich

(10) Patent No.: US 7,613,625 B2
(45) Date of Patent: *Nov. 3, 2009

(54) OVERALL RISK IN A SYSTEM

(75) Inventor: Nicolas Heinrich, Nice (FR)

(73) Assignee: Accenture SAS, Paris (FR)

( * ) Notice: Subject to any disclaimer, the term of this patent is extended or adjusted under 35 U.S.C. 154(b) by 687 days.

This patent is subject to a terminal disclaimer.

(21) Appl. No.: 10/984,057

(22) Filed: Nov. 9, 2004

(65) Prior Publication Data

US 2005/0114186 A1    May 26, 2005

Related U.S. Application Data

(63) Continuation of application No. 10/113,202, filed on Mar. 29, 2002, now Pat. No. 6,895,383.

(60) Provisional application No. 60/279,987, filed on Mar. 29, 2001.

(51) Int. Cl.
    G06F 17/50    (2006.01)
(52) U.S. Cl. .......................................................... 705/7
(58) Field of Classification Search ....................... 705/7
    See application file for complete search history.

(56) References Cited

U.S. PATENT DOCUMENTS

| 5,311,593 A | 5/1994 | Carmi |
| 5,655,074 A | 8/1997 | Rauscher |
| 5,679,940 A | 10/1997 | Templeton et al. |
| 5,734,697 A | 3/1998 | Jabbarnezhad |
| 5,798,950 A * | 8/1998 | Fitzgerald ...................... 703/17 |
| 5,892,903 A | 4/1999 | Klaus |
| 5,930,762 A | 7/1999 | Masch |
| 5,991,743 A | 11/1999 | Irving et al. |
| 6,006,016 A | 12/1999 | Faigon et al. |
| 6,064,972 A * | 5/2000 | Jankowitz et al. ............... 705/7 |
| 6,125,453 A | 9/2000 | Wyss |

(Continued)

FOREIGN PATENT DOCUMENTS

EP    0 999 489 A2    5/2000

OTHER PUBLICATIONS

Haimes, Yacov Y. "Risk Modeling, Assessment, and Management." John Wiley and Sons: 1998. pp. 165-167, 312-316, 319-321, 329-332, 352-353, 445, 449-451.*

(Continued)

*Primary Examiner*—Beth V Boswell
*Assistant Examiner*—Neil R Kardos
(74) *Attorney, Agent, or Firm*—Brinks Hofer Gilson & Lione

(57) ABSTRACT

A computer-implemented method and system for assessing the overall risk in at least part of an information technology system includes inputting into a risk assessment database a plurality of identified risks in a system; associating the risks to at least one severity band in a risk echelon; assigning a value to each risk; multiplying each risk value by a coefficient factor; and summing the factored risk values to determine the overall risk. The method preferably includes modifying the security implementation of the information technology system and determining the modified overall risk. The system preferably includes an automated vulnerability detection scanner to gather risk information, which is stored on a database and used in calculating the overall risk.

25 Claims, 10 Drawing Sheets

U.S. PATENT DOCUMENTS

| | | | |
|---|---|---|---|
| 6,205,552 | B1 | 3/2001 | Fudge |
| 6,219,805 | B1 | 4/2001 | Jones et al. |
| 6,223,143 | B1 | 4/2001 | Weinstock et al. |
| 6,282,546 | B1 | 8/2001 | Gleichauf et al. |
| 6,298,445 | B1 | 10/2001 | Shostack et al. |
| 6,301,668 | B1 | 10/2001 | Gleichauf et al. |
| 6,397,202 | B1 * | 5/2002 | Higgins et al. ............ 706/47 |
| 6,535,227 | B1 * | 3/2003 | Fox et al. ................ 715/736 |
| 2002/0147803 | A1 | 10/2002 | Dodd et al. |
| 2003/0033261 | A1 * | 2/2003 | Knegendorf ............ 705/400 |

OTHER PUBLICATIONS

Gerosa, S., et al. "Methods and Applications of Risk Management in Space Programs." Proceedings of the 30th Annual Project Management Institute 1999 Seminars & Symposium. Oct. 1999.*

Financial Institution Letters, "FDIC: Risk Assessment Tools and Practices for Information System Security," pp. 1-10, Jul. 1999.

Technical Paper, "Internet Scanner Technical Overview," Internet Security Systems, pp. 1-14, Mar. 2005.

Technical Paper, "Network and Host-based Vulnerability Assessment: A guide for information systems and network security professionals," Internet Security Systems, pp. 1-9.

Lansdowne, Zachary F. "Risk Matrix: An Approach for Prioritizing Risks and Tracking Risk Mitigation Progress," Oct. 1999.

Rosenberg, Linda H. "Software Metrics Program for Risk Assessment," Oct. 1996.

Akomode, O. Joseph et al. "Constructing customized models and providing information to support IT outsourcing decisions," Logistics Information Management, 1998.

"Eloff, JHP et al. A comparative framework for risk analysis methods," Computers & Security, Oct. 1993.

Rosenberg et al. "Continuous Risk Management at NASA," (Retrieved from Internet on Nov. 6, 2002), Feb. 1999.

Longstaff et al. "Are We Forgetting the Risks of Information Technology?" (Retrieved from Internet on Nov. 6, 2002), Dec. 2000.

Gerosa, S. et al. "Methods and Applications of Risk Management in Space Programs," (Retrieved from Internet on Nov. 6, 2002), Oct. 1999.

Straub, Detmar W. et al. "Coping with systems risk: Security planning models for management decision making," MIS Quarterly, Dec. 1998.

Haimes, Yacov. Risk Modeling, Assessment, and Management, 1998 [EIC].

International Search Report, date of publication, Nov. 21, 2002, in International Publication No. WO 02/062049 A3.

* cited by examiner

OVERALL RISK IN A SYSTEM

PRIORITY AND CROSS-REFERENCE TO RELATED APPLICATION

This is a continuation of U.S. application Ser. No. 10/113,202 filed on Mar. 29, 2002 (U.S. Pat. No. 6,895,383), which claims the benefit under 35 U.S.C. §119(e) of U.S. Provisional Application No. 60/279,987, filed Mar. 29, 2001.

BACKGROUND OF THE INVENTION

A risk assessment involves evaluating threats to business assets, identifying security vulnerabilities or weaknesses that can take advantage of those threats, and prioritizing business risk. System security is the overall effort focused on the protection of information assets to support the proper behavior of business systems.

System security is an ongoing process to mitigate damage, reduce threats and ensure continuity to ensure real outputs of systems consistent with expected outputs. System security also involves procedures, policies, physical security, organization, and could also involve hardware failures for instance. A vulnerability for a system could be, for example, that its related administration procedure does not require users to change passwords regularly. Another could be that there is nobody in charge of security administration on the system.

A security risk assessment is the first step in the life cycle of security management. At a high level, the risk assessment is a process which: evaluates threats to business assets; identifies security weaknesses or vulnerabilities that can be taken advantage of by those threats; and prioritizes business risk, as generally explained in the FDIC Financial Institution Letter 68-99, Risk Assessment Tools And Practices For Information System Security, Jul. 7, 1999, which is incorporated herein by reference. The security risk assessment is the process that typically drives all security planning, analysis and design activities in the later methodology stages.

The overriding goal of security is to protect the confidentiality, integrity, and availability requirements of the assets. The risk assessment will help determine what controls need to be in place to meet this goal cost effectively.

A security risk assessment typically includes the following steps: (1) analyzing the environment; (2) assessing the business risk; and (3) conducting security strategy sessions.

When analyzing the environment, often it is helpful to conduct a technical analysis. Technical analysis involves probing critical technology architecture components to look for common security holes. Operating systems and networks have known vulnerabilities that can be easily detected in a technical analysis. The purpose of this analysis is to determine the maturity of the security practices within the current infrastructure. This will help determine what security Best Practices may be implemented to improve the security of the overall environment.

Automated tools or intrusion detection procedures can be used to conduct an analysis. These tools may capture a picture of an individual system's security at one point in time. The tools may simulate attacks on the targeted system and provide a list of the technical vulnerabilities. The lists may be sorted by the level of vulnerability found: Low, Medium or High. The tests may not provide a good picture of the overall security in the network. The test results, however, provide statistical data that can drive home the assessment findings.

Another important step of risk assessment is to assess the business risk. This documents key assets, threats, vulnerabilities, and business effects to the environment; it also identifies major risks to the company and prioritizes them.

Determining what risks expose the organization to the most loss is a critical step in determining what controls need to be implemented. Risk may be reduced to the organization's acceptable level by implementing controls. The correct controls can be implemented only if the risks are prioritized according to potential impact to the business.

Security risk is the potential for damage or loss of an asset. It combines the value the owner places on the asset in potential danger, the impact the loss of the asset would have, and the likelihood that the weakness will be taken advantage of to damage the asset. Quantitatively:

$$Risk = (Potential\ damage) \times (Likelihood\ of\ occurrence)$$

Validation risk assessments and enterprise-wide risk assessments have the same basic purpose and process. The purpose of a risk assessment is to evaluate threats to assets, to identify vulnerabilities, to determine risk, and to develop countermeasures to mitigate risk. The process for doing this involves analyzing the environment, assessing business risk, and developing recommendations.

The scope of a security validation is to see how well the current design/implementation has mitigated the risk to the sponsoring organization. If the validation determines that there is remaining risk (called residual risk), then this has to be either formally approved by the organization or used to redesign additional security controls.

Regardless of how the risk assessments have been conducted, it is often difficult to compare the risks associated with alternative implementations. These risk assessments provide long lists of the individual risks, and relative threat of each risk that do not provide a true picture of the overall risk. Heretofore, there has not been a reliable method for accumulating the individual risks in a system to provide a realistic overall risk value. Thus, a system and method to calculate the overall risk of a system from the vulnerabilities found on each of its components and from different information resources is needed

BRIEF SUMMARY OF THE INVENTION

In one aspect, the invention applies a risk model that is quite complex, because it tries to stick to the reality as much as possible. As Risk is a complicated concept in nature, it is not surprising that its evaluation is not easy. However, the implementation of the model is relatively easy, and permits one to calculate the overall risk values automatically using computer-implementations of a risk analysis program. Knowing the overall risk in a system, one may design or modify the system and readily determine which risks to reduce or to eliminate to have the greatest reduction in the overall risk.

One embodiment of the invention includes a computer-implemented method for assessing the overall risk in at least part of an information technology system, which includes identifying a plurality of risks in a system; assigning the risks to at least one severity band in a risk echelon; assigning a value to each risk; multiplying each risk value by a coefficient factor; summing the factored risk values to determine the overall risk, and outputting the overall risk in a humanly-readable form.

DETAILED DESCRIPTION OF THE INVENTION

To give a fuller understanding of the full scope of the present invention, this section first describes the risk assessment methodology and the preferred mathematical equations for determining the overall risk in a system in accordance with various embodiments of the invention. Second, the section provides examples of the preferred embodiments of the invention. Third, this section describes exemplary physical hardware and data structures to implement and embody preferred aspects of the invention.

Figure 1:
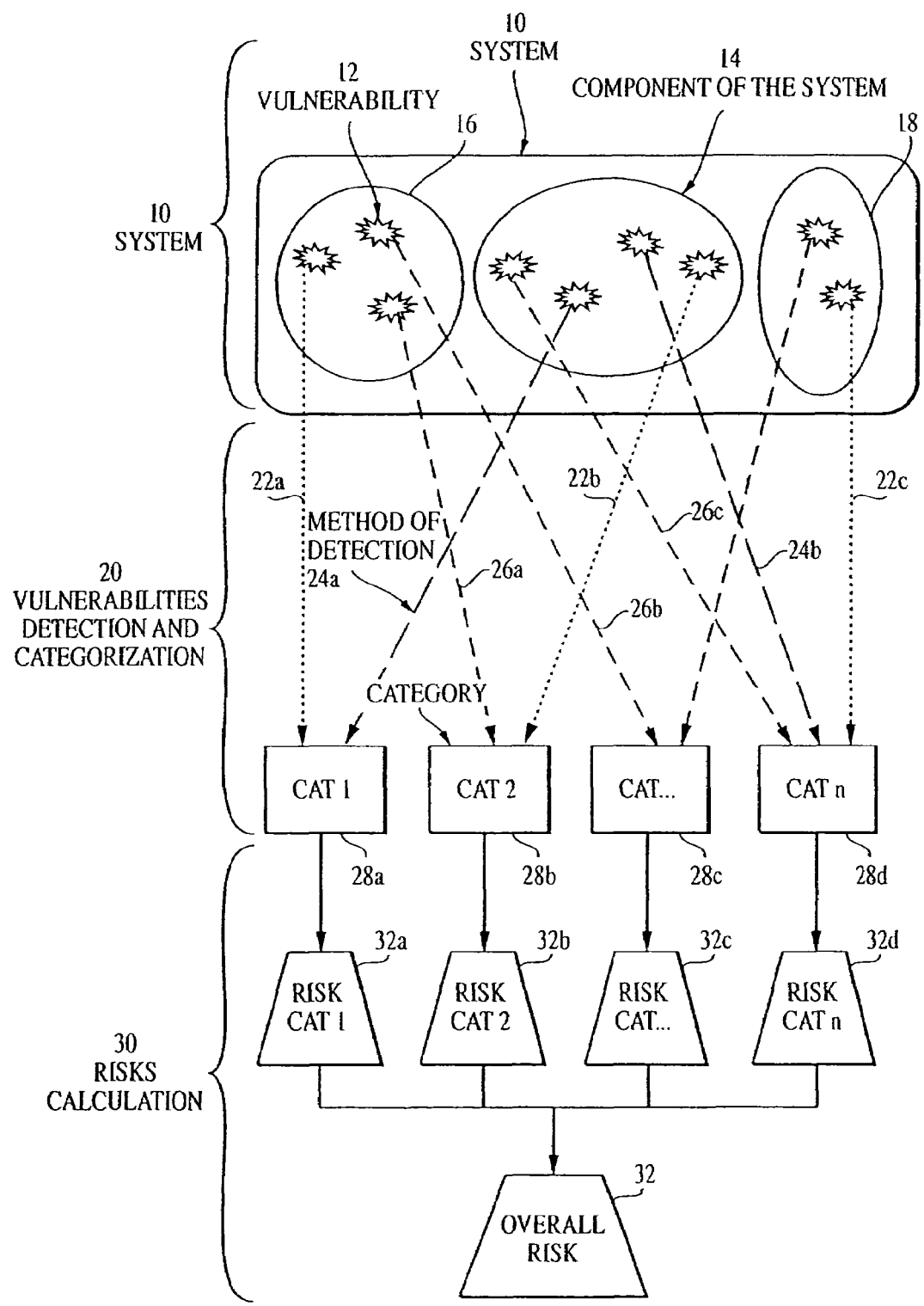
FIG. 1 illustrates the categorization of various vulnerabilities and associated risks.

As illustrated in FIG. 1, when evaluating the security risk in an information technology system 10, different information may be taken into account in order to get a relevant result. Several methods 22, 24 and 26 may be used to collect all this data. In an information system, the methods used can be, but are not limited to, (1) Network Scanning and Hosts Scanning with automated tools; (2) BackOffice analysis; (3) Interviews with the different actors of the system; and (4) Physical walk-throughs. The analysis of all the information collected allows disclosure of the different vulnerabilities 12 of the system.

Each of the vulnerabilities found concerns a fraction of the system. In this document, a fraction of a system is called a Component, and can be for example, (1) The entire system; (2) A sub-system of the system; (3) A server in the system; or (4) The physical means of transmission between hosts. FIG. 1 illustrates how several different method of assessment 22a, b, c, 24a, b, and 26a, b, and c, are used to detect a plurality of vulnerabilities 12 in several components 14, 16 and 18.

The risk associated with a Component taken independently of the system is not the same as its associated risk within the system. As a consequence, the distinction between the absolute risk and the relative risk of a Component is to be emphasized.

As shown in FIG. 1, all the vulnerabilities found can be arranged into different categories 28a, b, c and d, relating to the problem they deal with. The following are a list of some possible categories: (1) Organization and Roles; (2) Norms; (3) Execution Services; and (4) Storage Media.

Regrouping the vulnerabilities according to the category helps to better understand the security problems in a system. It will also allow one to find easily where the major security risks are located, which is fundamental to reduce the overall risk later on.

After detecting and categorizing 20 the individual vulnerabilities 12, the risk may be calculated 30 at various levels, such as at each category 32a, b, c and d, which then may lead to calculating the overall risk 32 of the system.

The model described herein allows the gathering and synthesizing of the risk values at different levels in a logical and consistent way. The overall risk calculated corresponds to the risk before a first vulnerability is exploited. Once this is done, the risk increases and its new value depend on many factors (vulnerability exploited and its implication on the Component and on the System). As a result, the value of the risk calculated is its real value at present, and its minimum value in the future.

DEFINITIONS

The following are the definitions of the different terms as used herein. The following acronyms are sources of definitions of terms used herein where noted. "NCSC TG-004": Nat'l Computer Security Center, *Trusted Network, Glossary of Computer Security Terms*, NCSC-TG-004, October 1988. "TNI": *Trusted Network Interpretation of the Trusted Computer System Evaluation Criteria*, NCSC-TG-005, National Computer Security Center, July 1987

| | |
|---|---|
| Risk Assessment | The process of identifying security risks, determining their magnitude, and identifying areas needing safeguards. Risk analysis is a part of risk management. [NCSC TG-004] |
| Category | A group allowing one to categorize the Risks dealing with the same security problem. A Category can be for instance Norms or Storage Media. |
| Method | A procedure used for identifying security risks and for determining their magnitude. It can be, for instance, Network Scanning, BackOffice Analysis or Interviews. |
| System | An assembly of computer and/or communications hardware, software, and firmware configured for the purpose of classifying, sorting, calculating, computing, summarizing, transmitting and receiving, storing and retrieving data with the purpose of supporting users. [TNI] |
| Component | A device or set of devices, consisting of hardware, along with its firmware, and/or software that performs a specific function on a computer communications network. A component is a part of the larger system, and may itself consist of other components. Examples include modems, telecommunications controllers, message switches, technical control devices, host computers, gateways, communications sub-nets, etc. [TNI] |
| Participation | Importance of the role of a given component in the integrity of the system functionality. |
| Vulnerability | A weakness in system security procedures, system design, implementation, internal controls, etc., that could be exploited to violate system security policy. [NCSC-TG-004] |
| Impact | Severity of a vulnerability on an component of the system. |
| Damage | Potential Damage that can be caused by exploiting one vulnerability of a component or of the system. |
| Likelihood | The probability for an event to happen in a given environment. |
| Risk | Value of the security danger associated to a component or to a system. It can be absolute or relative, depending on whether it is isolated or part of an environment. |
| Coverage | Proportion of the potential data treated in the security risk assessment of a System. The Coverage allows calculation of an evaluation of the real risk value of the system by extrapolating the obtained risk value to all the potential data. |

Each concept defined above can be symbolized as follows:

| | |
|---|---|
| Cat | Category of Risks |
| Met | Method of identifying Risks |
| S | System |
| C | Component of the System |
| P(C, S) | Participation of the Component C in the System S |
| V | Vulnerability |
| I(V) | Impact of a Vulnerability V |

-continued

| | |
|---|---|
| L(V, C) | Likelihood for the Vulnerability V to happen on the Component C |
| D(V, C) | Damage on the Component C caused by the Vulnerability V |
| R(V, C) | Risk of the Vulnerability V associated to the Component C |
| R(C) | Overall Risk associated to the Component C |
| R(C, S) | Risk associated to the Component C relatively to the System S |
| R(S) | Overall Risk associated to the System S |
| R(S, Cat, Met) | Risk associated to the System S in the Category Cat for the Method Met |
| Cov(S, Cat, Met) | Coverage of the assessment of the System S in the Category Cat for the Method Met |
| R(S, Cat) | Risk associated to the System S in the Category Cat |
| Cov(S, Cat) | Coverage of the assessment of the System S in the Category Cat |
| Cov(S) | Coverage of the assessment of the System S |
| <R(S)> | Evaluation of the real overall Risk associated to the System S |

Most of the values above will be expressed by a number between 0 and 1. Hence they can be more easily interpreted intuitively in terms of percentage. For instance, if the value of a Damage represents its relative degree of importance, the closer to 1 this value is, the more important the Damage is.

Mathematical Functions Description

| | |
|---|---|
| $A \in B$ | A is part of B |
| $C \in S$ | C is an Component of the System S |
| $\|A_B\|$ | Number of elements A in B |
| $\|V_C\|$ | Number of Vulnerabilities V in the Component C |
| $\|C_S\|$ | Number of Components C in the System S |
| $\partial_X$ | Equal to 1 if X is true and equal to 0 if X is false |
| $\delta_{V \in C}$ | Equal to 1 if V is a vulnerability of the Component C, and equal to 0 otherwise |

The equations below embody the broader concepts of one method of the invention. This method is useful for evaluating the overall risk in at least part of an information technology system. In broad terms, one aspect of the invention is a method for storing the risks identified in a system into a risk assessment database, then using a data processor to calculate the overall risk in the system using logic programmed with a risk analysis program based on the stored risks, and then outputting the overall risk in humanly-readable form.

In a second aspect of the invention, the method includes inputting into a risk assessment database a plurality of risks identified in a system, associating the risks to at least one severity band and a risk echelon and storing those associations in a memory storage device, assigning a value to each risk, multiplying each risk value by a coefficient factor, adding the factored risk values to determine the overall risks, and outputting an indication of the overall risk in a humanly readable form. Preferably, at least some of these steps are implemented on a computer having a risk analysis program. Preferably, the value assigned to each risk for this calculation is the mean value of the band in which the risk is assigned. Preferably, the coefficient factor for each risk value is smaller for risks in bands of lower severity. More preferably, the coefficients factors are selected such that the overall risk value does not exceed the upper limit of the highest severity band containing a risk.

In a third aspect of the invention, the method includes assigning individual risks to bands of varying severity in a risk echelon, determining a current overall risk value by calculating a mean risk value of the highest severity risk band containing a risk, and for each additional risk in the highest severity risk band, adding a first percentage of the space between the current overall risk value and the upper limit of the band. For each existing risk and bands of lower severity, the method includes adding a second percentage of the space between the current overall risk value and the upper limit of the highest severity band multiplied by a coefficient factor relative to the proportionate level of risks and the respective bands, and then outputting an indication of the overall risk in a humanly readable form. The intermediate determinations of the current overall risk may be output in display having a graphical visual representation, such as is shown in FIG. 4 described below.

Preferably, the first percentage of space and second percentage of space are between 10 and 60 percent. More preferably, the first percentage of space and the second percentage space are 50 percent. Preferably, the coefficient factor is the mean risk value of the band containing each existing risk divided by the mean risk value of the highest severity risk band.

Figure 4:
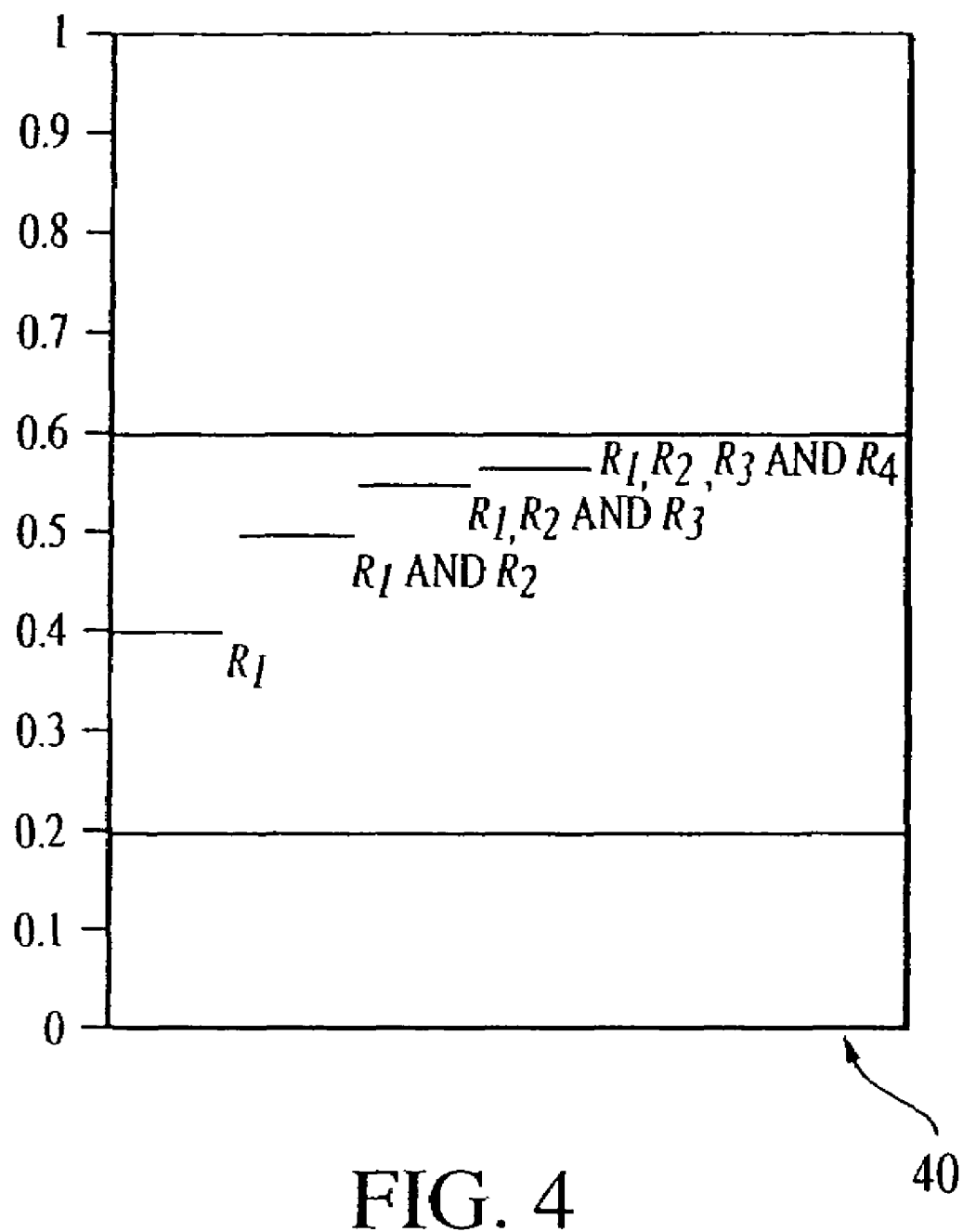
FIG. 4 depicts a visual representation of the successive intermediary calculation of overall risk for the individual risks of FIG. 3.

In a fourth aspect of the invention the method for calculating the overall risk can be considered in terms of the successive addition of the current or intermediated overall risk, $R_k$, and graphically depicted by a visual representation in FIG. 4. In this successive-addition method, the overall risk is determined by inputting into a memory storage device a plurality of risks identified in a system, associating the risks with at least one severity band in a risk echelon, assigning the initial overall risk value to be the lower limit of the highest severity band containing a risk, adding to the initial overall risk value a value of one-half of the difference between the upper limit of the highest severity band and the initial overall risk value to arrive at intermediate overall risk value $R_k$. For each additional risk in that same highest severity band, the method includes adding successively one-half the difference between the upper limit of the band and the most recent determined intermediate overall risk value. For each additional risk in bands of lower severity, the method includes adding successively one-half of the difference between the upper limit of the highest severity band and the most recent intermediate overall risk value, where the difference is multiplied by a coefficient factor, to calculate the most recent intermediate overall risk value. The most recent intermediate overall risk value determined for the last risk is taken as the overall risk value for the system. The overall risk is output from the computer or data processor in a humanly-readable form. Preferably, the coefficient factor is proportional to the mean risk value of the band containing the risk and the mean value of the highest severity band containing a risk.

In a fifth aspect of the invention, a system is provided for conducting a risk assessment of a computer network system. The system includes a risk assessment database, an automated detection scanner database for storing risk assessment information associated with the computer network system, a processor for accessing and analyzing data from the risk assessment database and the automated detection scanner database and for determining an overall risk value associated with at least one component associated with the computer network system. The system further includes a user computer for inputting risk assessment information to and for receiving risk assessment information from said risk assessment database, and an interface for displaying said overall risk value determined by the processor. Preferably, the system includes an automated vulnerability scanner in communication with the automated detection scanner database.

Additional aspects and embodiments of the invention will be understood from the following description.

The Band Model

In the overall risk calculation process in at least a part of a system, the problem of gathering several risk values into only one is faced several times. A simple average of the risk values or taking the maximum of them is not appropriate because it does not respect some risk principles. The Band Model respects every postulate associated with the risk, and allows calculation of a relevant value.

The calculation of an overall Risk value from several Risk values in a System preferably comply with the following principles:

(1) The hackers use today's tools and techniques that allow them to find easily the vulnerabilities in a System. Consequently, the value of the overall Risk is mainly represented by the value of the highest Risk.

(2) The overall Risk value will always be less than any higher Risk value that does not exist in the System. It means that even if there is a great number of Risks in a given value or range, the overall Risk will never reach the value of a single higher range in which no Risk exists.

(3) Once one Risk of a given range exists, the Risks of the same range will not increase the overall Risk significantly. This can also be explained by the fact that a hacker would probably find easily any of these vulnerabilities. It does not matter if there is only one or several Risks of the same value, as long there is at least one. Consequently, two high value Risks will have an overall Risk similar to the overall Risk of only one high Risk value. Adding Risks of the same value will always increase the overall Risk value, but less and less significantly.

Taking into account these risk properties, the overall Risk can be calculated using the following model.

Figure 2:
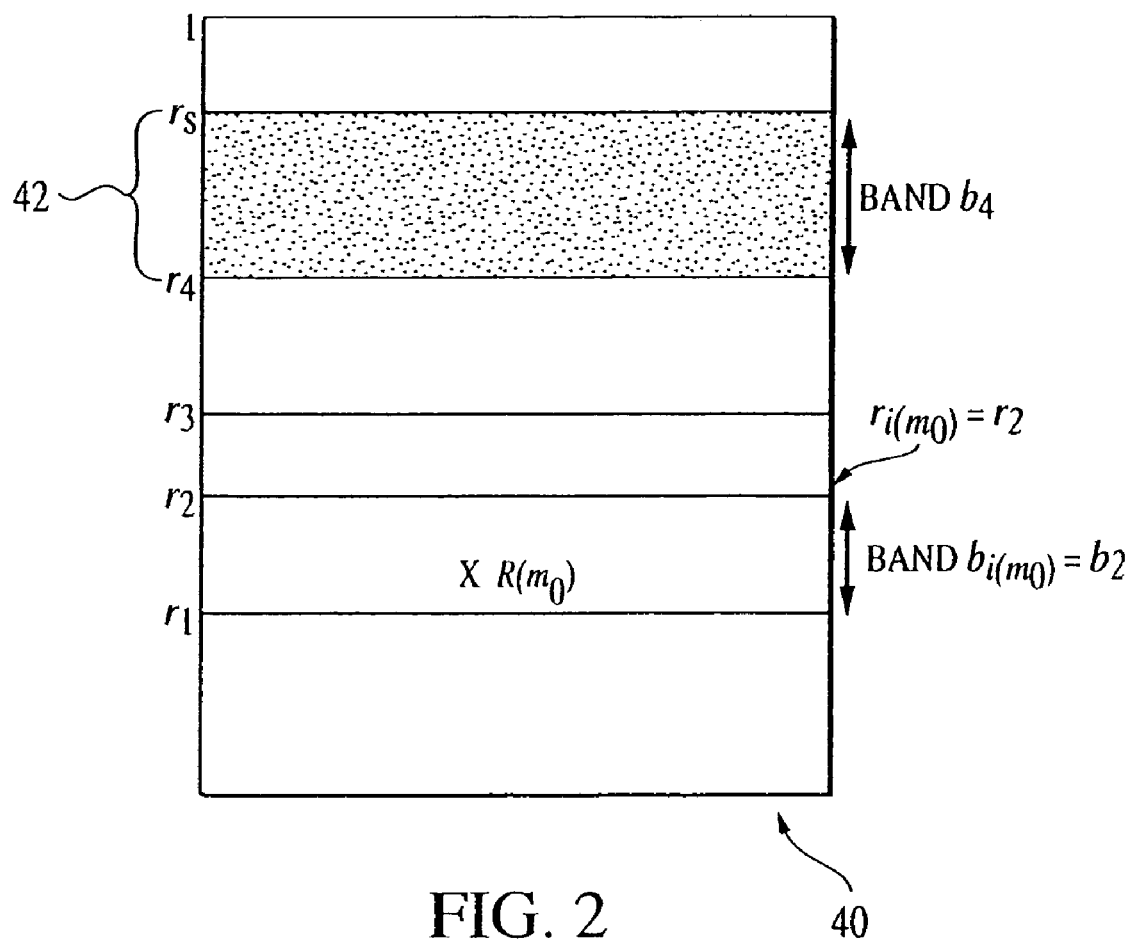
FIG. 2 depicts a risk echelon.

Referring to FIG. 2, different risk levels can be represented by a band 42 on a risk echelon 40. The value of the maximum risk value within a band $b_i$ is defined by $r_i$, which is a value between 0 and 1. The value 0 represents no risk at all and the value 1 is a 100% risk. If "n" risk levels are defined, the different upper risk limits are ordered like this:

$$\begin{cases} 0 \leq r_1 < r_2 < \ldots < r_n \leq 1 \\ r_0 = 0 \end{cases}$$

Then every Risk $R(m)$ placed into a band $b_i$: $r_{i-1} < R(m) \leq r_i$

The number i of the band of a Risk $R(m)$ can be written $i(m)$. Thus, the corresponding band will be written $b_{i(m)}$ and its associated upper risk limit $r_{i(m)}$ $\|R\|$ is the total number of Risks to gather. The $\|R\|$ Risks can be sorted according to their value, from the highest to the lowest:

$$R(m_1) \leq R(m_2) \leq \ldots \leq R(m_{\|R\|})$$

$$\underbrace{R(m_1), \ldots, R(m_{k1})}_{\text{Band } b_{i(m_1)}}$$

$$\underbrace{R(m_{k1+1}), \ldots, R(m_{k2})}_{\text{Band } b_{i(m_{k2})}}, \ldots, \underbrace{R(m_{kj+1}), \ldots, R(m_{\|R\|})}_{\text{Band } b_{i(m_{\|R\|})}}$$

The overall Risk can then be calculated as follow:
1. Take the mean value of the highest risk, which is the value in the middle of the band $b_{i(m_1)}$: $(r_{i(m_1)-1} + r_{i(m_1)})/2$ 2. Add the risks in the same band by summing half the space between the current overall risk value and the upper band limit. Doing so allows increasing the overall risk without reaching the band above.

3. Take the risks existing in the band below and add them the same way, with a proportional coefficient factor relative to the highest risk: $\lfloor (r_{i(m_k)-1} + r_{i(m_k)})/2 \rfloor / \lfloor (r_{i_{max}-1} + r_{i_{max}})/2 \rfloor$ 4. Repeat step 3 for all the bands below.

If the highest Risk $R(m_1)$ on the Component C is positioned in the band $i_{max} = i(m_1)$, the formula to calculate the overall Risk is:

$$R = r_{i_{max}-1} + (r_{i_{max}} - r_{i_{max}-1}) \times \sum_{k=1}^{\|R\|} \left[ \frac{1}{2^k} \times \frac{\frac{r_{i(m_k)-1} + r_{i(m_k)}}{2}}{\frac{r_{i_{max}-1} + r_{i_{max}}}{2}} \right]$$

and finally:

$$R = r_{i_{max}-1} + \frac{r_{i_{max}} - r_{i_{max}-1}}{r_{i_{max}} + r_{i_{max}-1}} \times \sum_{k=1}^{\|R\|} \left[ \frac{r_{i(m_k)-1} + r_{i(m_k)}}{2^k} \right]$$

Calculation with the Band Model will be noted:

$$R = \underset{m}{Band}[R(m)]$$

EXAMPLE 1

In order to illustrate and to facilitate the comprehension of the Band Model, a simple example of calculation is provided.

Figure 3:
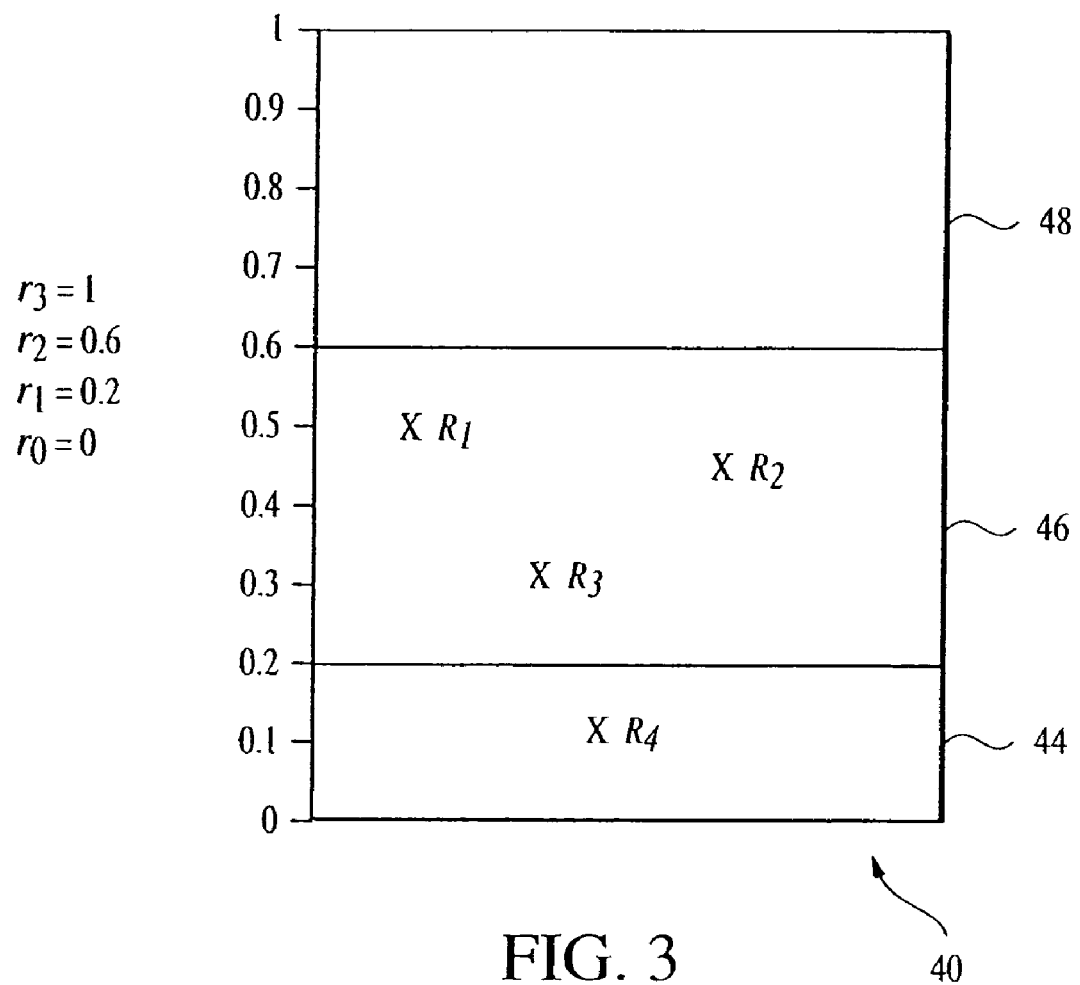
FIG. 3 depicts one example of a visual representation of individual risks plotted in a risk echelon.

As shown in FIG. 3, a risk echelon 40 composed of three bands 44, 46 and 48 is defined. The boundaries, or upper and lower limits, of each band can be defined differently depending on the use and is left to the judgment of the person using the model and inputting such information into the database, or the program may determine the boundaries based on traditional rules for judging risk severity known to one skilled in the art.

The boundaries between the bands may correspond to the degree of risk the person expects for each of them. For instance, if one expects low risks are below 20% risks, one sets the boundary to 0.20. Accordingly, as seen in FIG. 3, one risk is in the lowest band, three are in the middle band and none is in the upper band. Thus, the limits of the bands are: $r_3 = 1$, $r_2 = 0.6$, $r_1 = 0.2$, and $r_0 = 0$.

$$i_{max} = 2$$

$$\|R\| = 1 + 3 = 4$$

$$R = r_{i_{max}-1} + \frac{r_{i_{max}} - r_{i_{max}-1}}{r_{i_{max}} + r_{i_{max}-1}} \times \sum_{k=1}^{\|R\|} \left[ \frac{r_{i(k)-1} + r_{i(k)}}{2^k} \right]$$

$$R = r_1 + \frac{r_2 - r_1}{r_2 + r_1} \times \sum_{k=1}^{4} \left[ \frac{r_{i(k)-1} + r_{i(k)}}{2^k} \right]$$

$$R = 0.2 + \frac{0.6 - 0.2}{0.6 + 0.2} \times \left[ \frac{0.6 \times 0.2}{2} + \frac{0.6 + 0.2}{4} + \frac{0.6 + 0.2}{8} + \frac{0.2 + 0}{16} \right]$$

$$R = 0.556$$

Hence, the overall Risk is about 56%. The successive addition of the current or intermediate overall Risk, $A_{r_k}$, is graphically by a visual representation of a risk echelon 40 depicted in FIG. 4. In this model, the overall Risk approaches, but does not exceed, the upper limit of the highest band in which individual risks are located. Such a graphical representation may be output on a user interface to provide a visual representation of the relative contribution of the individual risks to the overall risk in the system.

Evaluation of the Absolute Risk at the Component Level

In addition to analyzing the overall risk in the system, the model may be applied to analysis of the overall risk on an individual component in the system. The Damage on a Component C caused by a Vulnerability V is a value comprised between 0 and 1, and represents the degree of damage potentially caused on the Component C by the Vulnerability V, independently of its participation in the System S.

$$D(V,C)=I(V)\times \delta_{V \in C}$$

The Risk represented by a Vulnerability V on a Component C taken independently of the System S is expressed by:

$$R(V,C)=D(V,C)\times L(V,C)$$

$$R(V,C)=I(V)\times L(V,C)\times \delta_{V \in C}$$

In the context of a typical risk assessment project for an enterprise, it is reasonable to consider that all the Components are subject to attack with the same probability. It implies that the Likelihood of a component does not depend on the Component any more:

$$L(V,C)=L(V)$$

The value provided by the different tools used on the project while assessing a vulnerability represents the potential risk of this vulnerability. This value will be called Evaluation, and will be symbolized with an E:

$$E(V,C)=I(V)\times L(V)\times \delta_{V \in C}$$

E(V,C) will be provided by the tools, the interviews and the different analysis. For example, E(V,C) can take three different values for ISS Network Security Scanner, depending on the gravity of the impact and on the likelihood of occurrence of the vulnerability. Thus, the Risk of a Vulnerability on a Component will be given by:

$$R(V,C)=E(V,C)$$

The calculation of the overall Risk on a Component can be achieved by using the Band Model, because the following principles are respected:

(1) The hackers use today's tools and techniques that allow them to find easily the vulnerabilities in a system. Consequently, the value of the overall Risk on a Component is mainly represented by the value of the highest vulnerability on this Component.

(2) The overall Risk value of a Component will always be less than any higher Risk values that do not exist on this Component. It means that even if the Component owns a great number of Risks of a given value, the overall Risk will never reach the value of a single higher Risk.

(3) Once one Risk of a given value exists on a Component, the Risks of the same value existing on this Component will not increase its overall Risk significantly. This can also be explained by the fact that a hacker would probably find easily any of these vulnerabilities. No matter if the Component owns only one or several Risks of the same value, as long as it owns at least one. Consequently, a Component with two high value Risks will have an overall Risk similar to the overall Risk of a Component with only one high Risk value. Adding Risks of the same value on a Component will always increase the overall Risk value, but less and less significantly.

Different risk levels can be represented by a band on a risk echelon. The value of the maximum risk value within a band $b_i$ is defined by $r_i$:

$$\begin{cases} 0 \leq r_1 < r_2 < \ldots < r_n \leq 1 \\ r_0 = 0 \end{cases}$$

Then every Risk R(V,C) is placed into a band $b_i$: $r_{i-1} < R(V,C) \leq r_i$

The number i of the band of a Risk R(V,C) can be written i(V,C). Thus, the corresponding band will be written $b_{i(V,C)}$ and its associated upper risk limit $r_{i(V,C)}$.

$\|V_C\|$ is the total number of Risks on a given Component. The $\|V_C\|$ vulnerabilities on a Component can be sorted regarding to their Risk associated from the highest to the lowest:

$$R(V_1, C) \leq R(V_2, C) \leq \ldots \leq R(V_{\|V_C\|}, C)$$

$$\underline{R(V_1, C), \ldots, R(V_{k1}, C),}_{\text{Band } b_{i(V_1,C)}}$$

$$\underline{R(V_{k1+1}), \ldots, R(V_{k2}, C),}_{\text{Band } b_{i(V_{k2},C)}} \ldots, \underline{R(V_{kj+1}, C), \ldots, R(V_{\|V_C\|}, C)}_{\text{Band } b_{i(V_{\|V_C\|},C)}}$$

If the highest Risk $R(V_1,C)$ on the Component C is positioned in the band $i_{max} = i(V_1,C)$, the overall Risk can be calculated as follows:

$$R(C) = r_{i_{max}-1} + \frac{r_{i_{max}} - r_{i_{max}-1}}{r_{i_{max}} + r_{i_{max}-1}} \times \sum_{k=1}^{\|V_C\|} \left[ \frac{r_{i(V_k,C)-1} + r_{i(V_k,C)}}{2^k} \right]$$

$$R(C) = \underset{V}{Band}[R(V,C)]$$

EXAMPLE 2

Within the scope of a risk assessment project, three levels of Risks are defined: High, Medium and Low. The three bands are distributed as follow: $r_3=1$, $r_2=0.7$, $r_1=0.3$, and $r_0=0$. High Risks are between 1 and 0.7. Medium Risks are between 0.7 and 0.3. Low Risks are between 0.3 and 0.

If a Component has 2 medium and 4 low Risks, the overall Risk on the Component is calculated as follows:

$$i_{max} = 2$$

$$\|V_C\| = 2 + 4 = 6$$

$$R(C) = r_{i_{max}-1} + \frac{r_{i_{max}} - r_{i_{max}-1}}{r_{i_{max}} + r_{i_{max}-1}} \times \sum_{k=1}^{\|V_C\|} \left[ \frac{r_{i(V_k,C)-1} + r_{i(V_k,C)}}{2^k} \right]$$

$$R(C) = r_1 + \frac{r_{i_{max}} - r_{1_{max}-1}}{r_{1_{max}} + r_{i_{max}-1}} \times \sum_{k=1}^{6} \left[ \frac{r_{i(V_k,C)-1} + r_{i(V_k,C)}}{2^k} \right]$$

$$R(C) = r_1 + \frac{r_2 - r_1}{r_2 + r_1} \times \sum_{k=1}^{6} \left[ \frac{r_{i(V_k,C)-1} + r_{i(V_k,C)}}{16} \right]$$

-continued $$R(C) = 0.3 + \frac{0.7 - 0.3}{0.7 + 0.3} \times$$
$$\left[\frac{0.7 + 0.3}{2} + \frac{0.7 + 0.3}{4} + \frac{0.3 + 0}{8} + \frac{0.3 + 0}{16} + \frac{0.3 + 0}{32} + \frac{0.3 + 0}{64}\right]$$
$$R(C) = 0.63$$

Hence, the overall Risk on the Component is 63%.

Evaluation of the Relative Risk at the Component Level

In addition to determining the overall absolute risk of a component, the method may be used to determine the overall relative risk of the component. A system can be partitioned into several sub-systems, network devices or transmission media. Each one of these elements is considered as a Component of the system. A Component can be itself composed of several sub-Components.

A Component has a particular mission towards the System, which can be more or less important. The Participation of a Component represents its implication in the functionality of the System. The higher the Participation, the more vital is its presence in the System.

The value of a Participation is a number between 0 and 1. If a Component has a Participation value equal to 0, its deficiency does not affect the System at all. On the contrary, if the value of the Participation is 1, the Component is absolutely indispensable to the System. With a Participation value of 0.5, the absence of the Component causes a loss of half the functionality of the System.

To properly set the value of the Participation of the different Components in a System, it is recommended to look at the business risk first to determine the losses when a particular Component does not function.

EXAMPLE 3

Figure 5:
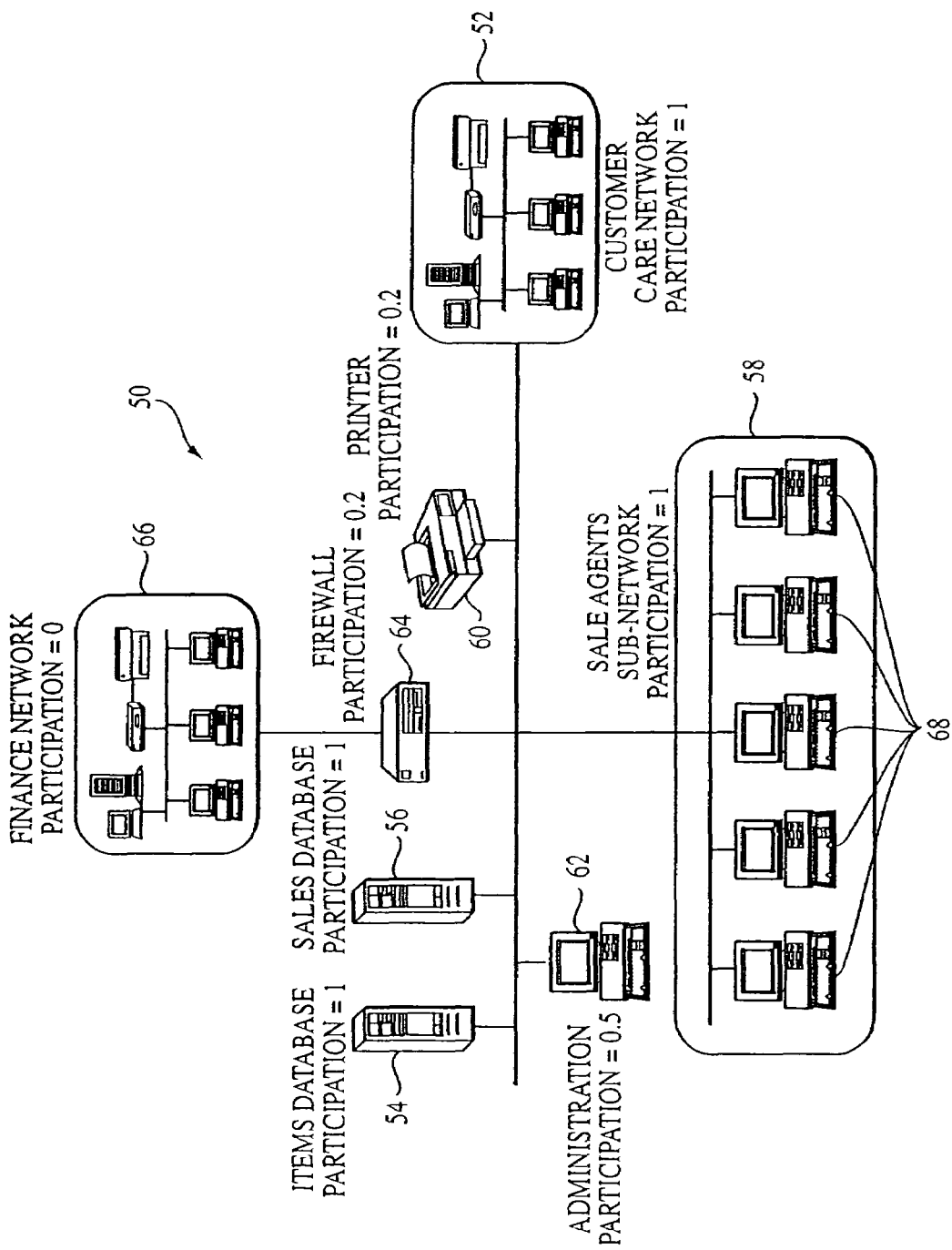
FIG. 5 depicts one example of a network system architecture.

The following is an example of a small information technology system or computer network system in charge of the Sales Orders in a company. The network system architecture 50 is illustrated in FIG. 5. It includes eight components: (1) the Customer Care Network 52, which provides the customer information; (2) the Items Database 54, which contains the details and the prices of the items on sale; (3) the Sales Orders Database 56, which contains the details of the items sold to the customers; (4) the Sales Agents Sub-Network 58, which is used by the sellers; (5) a printer 60; (6) an Administration console or computer 62; (7) a corporate firewall 64 between the Sales Order Network and the Finance Network 66, which mission is mainly to protect the Finance Network; and (8) the Finance Network 66, which uses the order information stored in the Sales Orders DataBase 56, but which is not necessary.

Within a Component, the participation of each element can be calculated the same way. For instance, within Sales Agents Sub-Network 58, each Sales Agent console 68 can have its own participation, relating to the Sale Agents Sub-Network.

The Risk of a Component R(C) calculated in the preceding sections represents the Absolute Risk of this Component. The Relative Risk R(C,S) measures the Risk associated to the Component relating to the entire system, and can be calculated by multiplying the Absolute Risk with the Participation of the Component in the System:

$$R(C,S) = R(C) \times P(C,S)$$

Evaluation of the Risk at the System Level

Taking into consideration the determination of the risks of each component, the calculation of the overall Risk associated to the System can be achieved by using the Band Model because the following principles may be respected:

(1) The overall Risk on a System does not decrease as the total number of Components increase. The fact that the hackers have the possibility to check all the Components with automated tools implies they can find easily the more sensible Component. Hence, the value of the overall Risk on a System is mainly represented by the value of the highest relative Risk on a Component of the System.

(2) The overall Risk value of a System will always be less than any potential higher relative Risk value that does not exist on any Component in the System. This means that even if the System owns a great number of Components with a relative Risk of a given value, the overall Risk of the System will never reach the value of a single higher relative Risk.

(3) Once one Risk of a relative Risk of a given value exists in the System, the Components with a relative Risk of the same value will not increase the overall Risk of the System significantly. This can also be explained by the fact that a hacker would probably find easily any of these Components. No matter if the System owns only one or several Components with a relative Risk of the same value, as long as it owns at least one. Consequently, a System owning two Components with high relative Risk values will have an overall Risk similar to the overall Risk of a System with only one Component of the same high relative Risk value. Adding Components with relative Risks of the same value in a System will always increase the overall Risk value, but less and less significantly.

Different risk levels can be represented by a band on a risk echelon. The value of the maximum risk value within a band $b_i$ is defined by $r_i$:

$$\begin{cases} 0 \leq r_1 < r_2 < \ldots < r_n \leq 1 \\ r_0 = 0 \end{cases}$$

Then every Risk R(C,S) is placed into a band $b_i$: $r_{i-1} < R(C,S) \leq r_i$

The number i of the band of a Risk R(C,S) can be written i(C,S). Thus, the corresponding band will be written $b_{i(C,S)}$ and its associated upper risk limit $r_{i(C,S)}$.

$\|C_S\|$ is the total number of Components in the System. The $\|C_S\|$ Components can be sorted according to their relative Risk associated from the highest to the lowest:

$$R(C_1, S) \leq R(C_2, S) \leq \ldots \leq R(C_{\|C_S\|}, S)$$

$$\underbrace{R(C_1, S), \ldots, R(C_{k1}, S)}_{\text{Band } b_{i(C_1,S)}}, \underbrace{R(C_{k1+1}, S), \ldots, R(C_{k2}, S)}_{\text{Band } b_{i(C_{k2},S)}}, \ldots ,$$

$$\underbrace{R(C_{kj+1}, S), \ldots, R(C_{\|C_S\|}, S)}_{\text{Band } b_{i(C_{\|C_S\|},S)}}$$

If the highest relative Risk $R(C_1,S)$ on the Component C is positioned in the band $i_{max} = i(C_1,S)$, the overall Risk can be calculated as follows:

$$R(S) = r_{i_{max}-1} + \frac{r_{i_{max}} - r_{i_{max}-1}}{r_{i_{max}} + r_{i_{max}-1}} \times \sum_{k=1}^{\|V_C\|} \left[ \frac{r_{i(V_k,C)-1} + r_{i(V_k,C)}}{2^k} \right]$$

$$R(S) = \underset{C}{\mathrm{Band}}[R(C, S)]$$

Risk of the System Per Category

The preceding section described how to calculate the Risk of a System starting from the Component level. Depending on the Method used and on the Category of the Risk, it is not always necessary and even sometimes not possible to start from the Component level. For instance, it is reasonable to start at the Component level for the Network and Hosts Scanning Method, but it might not be for the Physical Walkthrough Method if the System is in the same room. In the latter case, the Risk of the System can be evaluated directly at the System level. In all the cases, a value of the Risk of the System per Method and per Category is already calculated: R(S,Cat, Met).

As shown in FIG. 1, each method for detecting vulnerabilities can develop a list of risks that fall into a variety of categories. Through an iterative process, one can calculate the overall risk per category, and then regroup those risks per category to calculate the overall risk to the covered part of the system. Then one can estimate the overall risk of the entire system, as discussed in more detail below.

The Coverage of the evaluation of the Risk with a given Method for a particular Category can be calculated by dividing the number of checks made by the number of checks potentially available for the System:

$$Cov(S, Cat, Met) = \frac{\|CompletedCheck(S, Cat, Met)\|}{\|PossibleCheck(S, Cat, Met)\|}$$

What is interesting now is to calculate the Risk of the System in each Category R(S,Cat) and its associated Coverage Cov(S,Cat). As it has been mentioned before, these data allow one to more easily locate the efforts which have to be made to reduce the overall Risk of the System.

Again, the calculation of R(S,Cat) can be performed with the Band Model, starting from the values of the Risk R(S,Cat, Met) obtained by the different methods:

$$R(S, Cat) = r_{i_{max}-1} + \frac{r_{i_{max}-1} - r_{i_{max}-1}}{r_{i_{max}-1} + r_{i_{max}-1}} \times$$

$$\sum_{k=1}^{\|Met\|} \left[ \frac{r_{i(S,Cat,Met_k)-1} + r_{i(S,Cat,Met_k)}}{2^k} \right]$$

$$R(S, Cat) = \underset{Met}{\mathrm{Band}}[R(S, Cat, Met)]$$

The Coverage per Category Cov(S,Cat) can be obtained by calculating the average of all the Cov(S,Cat,Met) weighted with a coefficient W(Cat,Met), which represents the importance of the Method for the Category. For instance for the Category Norms, the Interviews and BackOffice Analysis Methods might be more relevant than the Network Scanning and Physical Walkthrough Methods.

$$Cov(S, Cat) = \frac{\sum_{Met}[Cov(S, Cat, Met) \times W(Cat, Met)]}{\sum_{Met} W(Cat, Met)}$$

Overall Risk of the System

The overall Risk of the System can be calculated with the Band Model, starting from the Risk per Category R(S,Cat) weighted with a coefficient Im p(Cat), which is the Importance of the Category in the Risk evaluation. For instance, the Storage Media might not be as important as the Execution Services. Im p(Cat) is a coefficient between 0 and 1.

$$R(S) = \underset{Cat}{\mathrm{Band}}[R(S, Cat) \times Imp(Cat)]$$

The Coverage Cov(S) can be obtained by calculating the average of all the Cov(S,Cat) weighted with the Importance of the Category Im p(Cat):

$$Cov(S) = \frac{\sum_{Cat}[Cov(S, Cat) \times Imp(Cat)]}{\sum_{Cat} Imp(Cat)}$$

Figure 6:
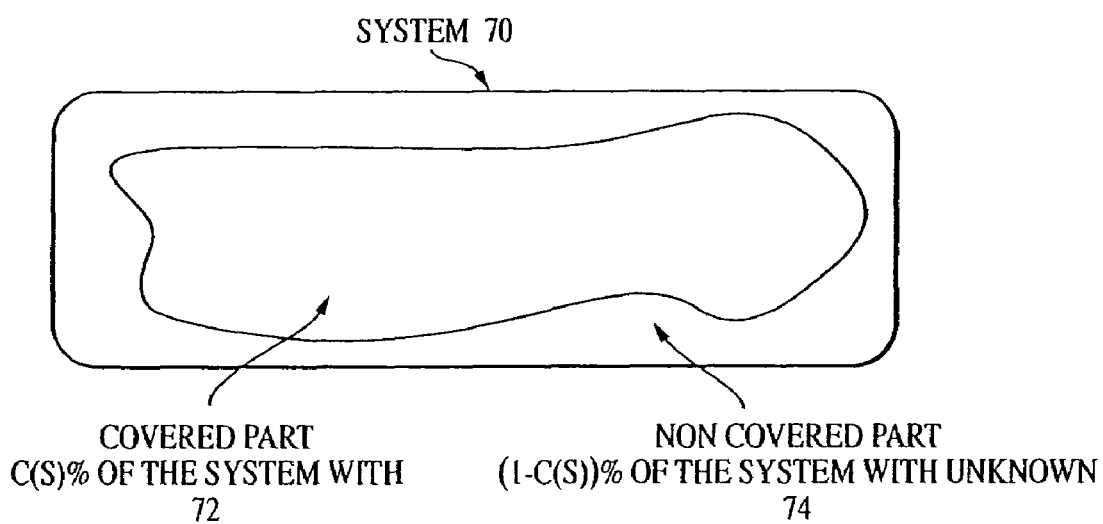
FIG. 6 represents a system with covered and uncovered risks.

It is now possible to calculate an estimation of the real Risk of the entire System from the overall Risk calculated and its Coverage. As shown in FIG. 6, a system 70 includes both the covered part 72 and uncovered part 74. The covered part makes up C(S)% of the system with a Risk, R(S); and the uncovered part makes up (1-C(S))% of the system with an unknown Risk.

The problem is then to find a relevant value for the Risk associated with the non-covered part of the System. The best evaluation that can be done is to consider the Risk uniform in all the System and equal to R(S). An estimation of the overall risk in the entire System, (R(S)), can then be calculated using the Band Model.

In order to estimate the Risk values to use in the Band Model, an estimation can be done as follows:

If R(S) is located in the band $b_{i_0}$, then finding the number of Risks $R_{i_0}$ in the band $b_{i_0}$ is necessary to obtain the Risk R(S) in the Covered Part. This can be done by inverting the Band Model, and is given by the formula:

$$n_{CoveredPart} = \frac{\log(r_{i_0} - r_{i_0-1}) - \log(r_{i_0} - R(S))}{\log(2)}$$

Evaluating the total number of Risks at that level in the entire System:

$$n_{System} = \frac{n_{CoveredPart}}{C(S)}$$

Calculating the evaluation of the Risk with the Band Model on the entire System:

$$\langle R(S) \rangle = \underset{n_{System}Risks}{Band} [R_{i_0}]$$

EXAMPLE 4

In another example of using this model in a real-life application, Table 1 below lists the individual risks associated with a variety of network system architectures. The bands were set according to subjective interpretation of the persons conducting the risk assessment. The band limits were established as follows $r_5=1.0$; $r_4=0.75$; $r_3=0.60$; $r_2=0.25$; $r_1=0.10$; and $r_0=0$. The Architecture Risk Value for each was calculated for each proposed architecture according to the model of the present invention. The risks were identified, gathered and input into memory storage device on a computer having logic programmed with a risk analysis program with a Microsoft Excel spreadsheet. The spreadsheet was programmed to calculate the overall risks for each proposed architecture according to the equation:

$$R = \underset{m}{Band} [R(m)]$$

As is evident from the overall risk values, absolute number of individual risks does not provide an accurate comparison of the overall risk associated with each architecture. In this case, the addition of a network security administrator (Sec. Admin.) eliminated the risks from the high-risk categories that realized greatest minimization of the overall risks.

TABLE 1

| | | Initial Architecture | Architecture 1 | Arch. 1 with Sec. Admin. | Architecture 2 | Arch. 2 with Sec. Admin. |
|---|---|---|---|---|---|---|
| Risks Count | High | 9 | 1 | 0 | 1 | 0 |
| | High-Medium | 7 | 3 | 0 | 3 | 0 |
| | Medium | 8 | 8 | 2 | 1 | 0 |
| | Medium-Low | 0 | 1 | 1 | 0 | 0 |
| | Low | 1 | 1 | 1 | 1 | 1 |
| | Total | 25 | 14 | 4 | 6 | 1 |
| | Architecture Risk Value | 99.97% | 93.62% | 52.10% | 93.10% | 5.00% |

One advantage of calculating the overall risk value in the system is that it can be integrated into automatic vulnerability assessment tools, such as but not limited to the ISS Network Security Scanner, commercially available from ISS, in Atlanta, Ga. Instead of getting a long list of individual risk values from such automated tools, one could obtain a single risk value for the overall system. One would need to input into the tool the different components and their participation in the system, as well as the importance and other weight factors to apply to the various categories and methods of risks determined.

This band model approach to calculating overall risk is useful for selecting alternatives that may be most cost effective for reducing overall risks. Additional advantages of the band model are that the calculation of the overall risk allows one, for instance, to: (1) understand what is the actual risk of a system, which is easier to evaluate than a long list of risks; (2) see how the overall risk in the system would be affected when simulating changes in the system (this would modify the list of risks and thus the overall risk); (3) compare several overall risks values during a system life time to see how it evolves; and (4) compare the overall risks values of several systems to understand if it is acceptable or not.

Now, having described the how the overall risk is determined, additional aspects of the invention will be better understood and illustrated by describing exemplary physical hardware and data structures to implement and embody preferred aspects of the invention.

Figure 7:
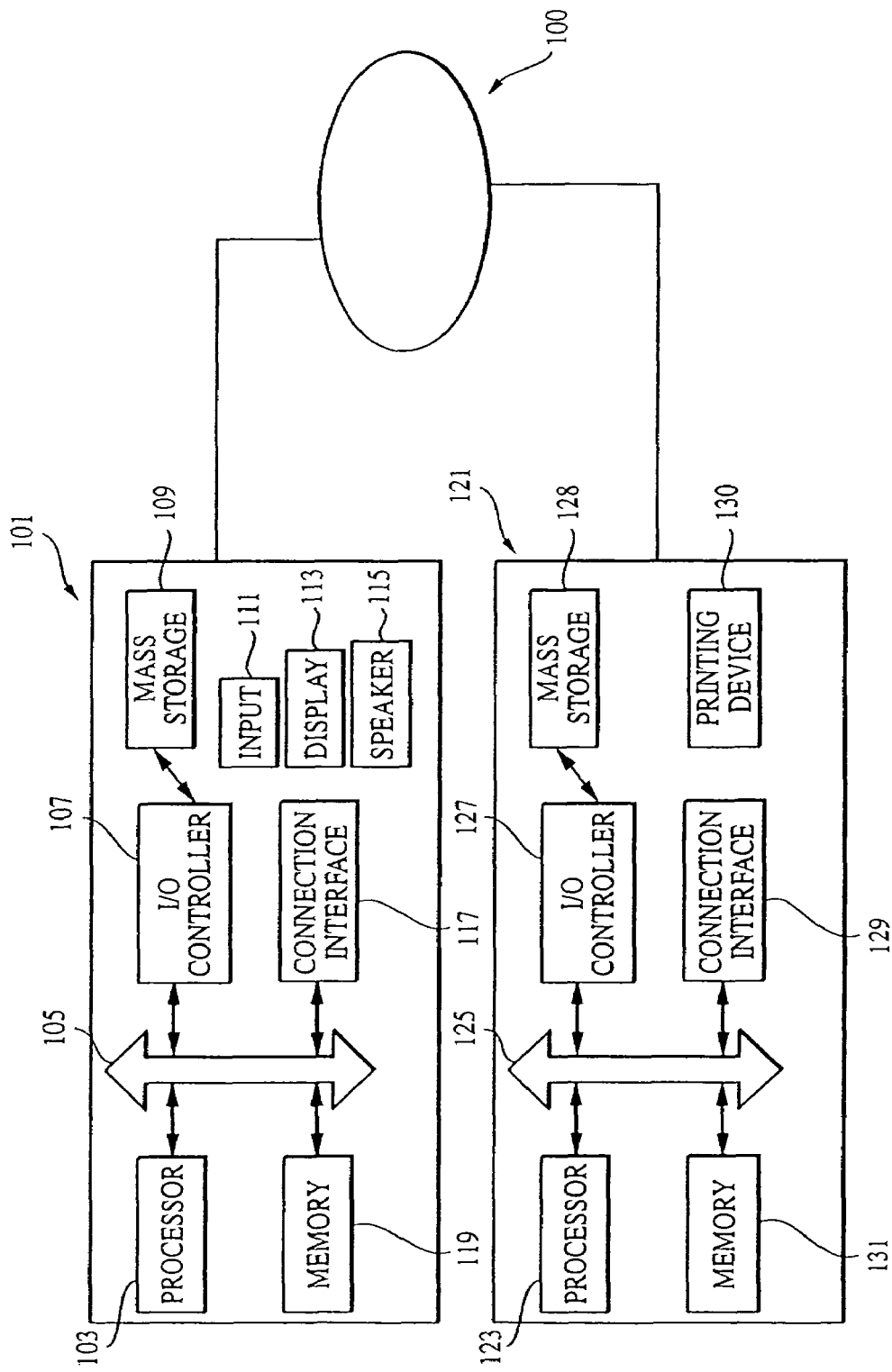
FIG. 7 illustrates a system containing a user computer, a network and a security computer.

FIG. 7 illustrates a system containing a user computer, a network and a security computer. In this example, data or information from at least one user computer 101 is transferred through the interconnection of at least one network 100 to at least one security computer 121. User computer 101 is also interconnected to network 100. Network 100 represents, for example, the Internet, which is a publicly accessible distributed interconnection of networks. Network 100 may also represent a corporate extranet or intranet, which is a privately accessible distributed interconnection of networks. In addition, the network 100 may be a local access network, a wireless local network, a wide area network, a metropolitan area network, a virtual area network or any network that may be able to facilitate the transfer of data between computers or servers.

User computer 101 includes conventional components such as a processor 103, an input/output (I/O) controller 107, a mass storage device 109, an input device 111, a display device 113, at least one speaker 115, a connection interface 117, and a memory 119. The processor 103, memory 119, I/O controller 107, and the connection interface 117 are interconnected through a bus 105.

Mass storage device 109 is interconnected to portions of user computer 101 through I/O controller 107. Input device 111 can be a keyboard, a mouse, a touch screen, a graphical user interface or any other device or method that can be utilized as an input device. Display device 113 is any type of conventional display that may have a liquid crystal display (LCD). Speaker 115 may be any type of conventional speaker. Connection interface 117 provides an operative connection from user computer 101 to network 100. The architecture illustrated in the user computer is typical for a personal computer "PC" type, where any type of computer is capable of operating as a server.

Security computer 121 includes conventional components such as a processor 123, an input/output (I/O) controller 127, a mass storage device 128, a connection interface 129, a memory 131 and at least one printing device 130. The processor 123, memory 131, I/O controller 127, and the connection interface 129 are interconnected through a bus 125.

Mass storage device 128 is interconnected to portions of security computer 102 through I/O controller 127. Even though it is not shown security computer 121 may also include: an input device, a display device and at least one speaker. Connection interface 129 provides an operative connection from security computer 121 to network 100. The architecture illustrated in the security computer is typical for a personal computer "PC" type, where any type of computer is capable of operating as a server.

Figure 8:
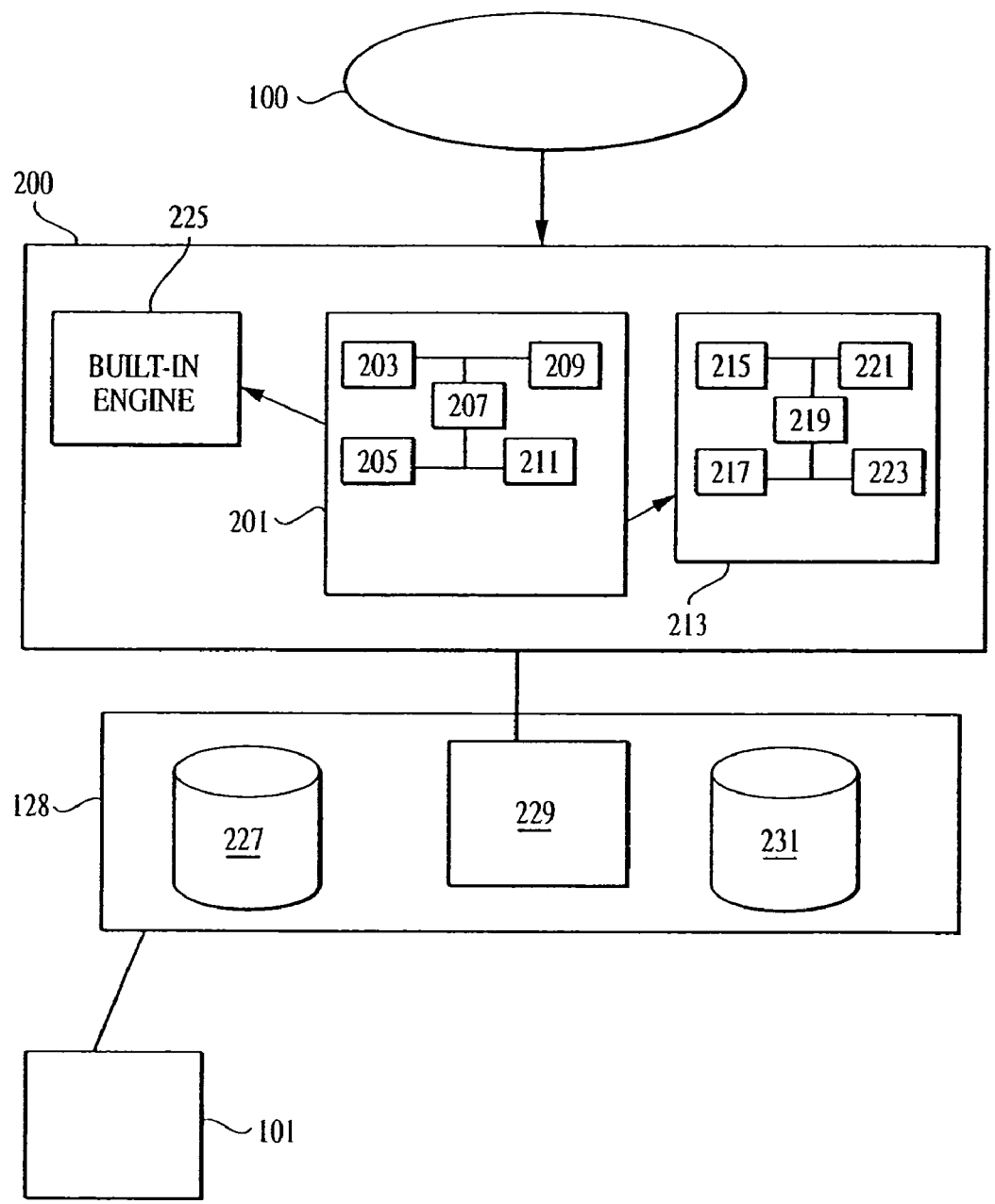
FIG. 8 illustrates an automatic intrusion detection system.

FIG. 8 illustrates an automatic intrusion detection system utilized in conjunction with user computer 101, the network 100 and security computer 121. Security computer 121 includes the processor 123 and the mass storage device 128. Processor 123 includes an automated vulnerability scanner 200. The automated vulnerability scanner 200 includes a built-in engine 225, a scanner engine 201, and a plug-in engine 213.

Mass storage device 128 includes magnetic disk drives, single-in-line memory module (SIMM) or magneto-optical disk drives. SIMM is a module containing one or several random access memory (RAM) chips on a small circuit board with contact pins that connect a computer motherboard. In alternative embodiments, however, other storage systems may be used, such as bubble memory, flash memory, or systems using other storage technologies. Mass storage device 128 may also include an internet scanner database 227, a risk assessment database 231 and a reporting environment 209. Risk assessment database 231 may also be located in the mass storage device 109 of user computer 101. The automated vulnerability scanner 200 may be an application tool from Internet Security Systems, Inc., Atlanta, Ga., USA, as referred to above, which may be utilized in conjunction with this invention. Accordingly, the invention is illustrated as being implemented on such a scanner application tool.

Scanner engine 201 includes: a session manager 203, a thread and service manager (TSM) 205, a policy manager 207, an execution context 209, and a data manager 211. Session manager 203 creates and manages a collection of scanning session objects. Each session object contains a target address list, a license file name, and policy file name. The session manager 203 has the execution content 209 that manages the startup and shutdown of session objects.

Thread and service manager (TSM) 205 creates a pool of threads and a number of background processes used by exploits in the engine. A thread is the series of checks run on a given host, one thread per host, and the maximum number of threads that can be open simultaneously is 128. The individual threads provide an execution context for running a scan of an individual target. TSM 205 opens listening processes for exploits that involves a response from the target host, such as port scans.

Execution context 209 provides a context in which all of the checks specified by the policy are run against the target within a given thread, after receiving a target and a policy from session manager 203. When all of the checks in the policy are completed, the execution context 209 requests a new policy and target from the session manager 203. If another target is available, execution (i.e. the session) continues; otherwise, execution terminates.

Policy manager 207 also includes a policy editor (not shown). In addition, policy manager 207 maintains a list of scan policy objects. Each scan policy object describes the configuration properties for all enabled vulnerability checks. Policy editor displays the policy information, allowing users to customize their scan sessions and obtain detailed Help Information about specific vulnerability checks. Data manager 211 saves a HostFound, Vulnerability Found, and Service Found result objects that each vulnerability check can produce.

Next, plug-engine 213 loads and manages the execution of plug-in vulnerability checks. The Plug-In engine 213 component of the scan engine 201 includes the following subcomponents: a resource manager 215, a plug-in checks 217, an exploit manager 219, a scheduler 221 and an execution manager 223.

Resource manager 215 maintains a list of network scanning resources, a namespace scope the resource lives in, and its activation lifetime. A resource can be either a transmission control protocol (TCP) connections, a Password List, an RPC connection, or other resources utilized by an exploit. Internet Scanner uses resource manager 203 to provide access to all types of objects regardless of their implementation.

Plug-Ins checks 217 are an improved type of vulnerability check that can be updated through the XPU process without requiring a full update of the product. Checks are represented in the exploit manager 219 as exploit objects. Exploit manager 219 maintains a collection of exploit objects and exposes an interface to retrieve references to these objects.

Scheduler 221 generates a task list of checks to be run, orders this task list, and provides the execution manager 223 with the current check to run and its target information. Execution manager 223 works with scheduler 221 to execute all of the exploits in the task list. Execution manager 223 retrieves an exploit object and its target information from the scheduler 221, prepares the exploit to be run, executes the exploit, and then processes the results. Execution manager 223 is the component that performs the function call for found vulnerabilities that is sent to data manager 211.

Next, built-in engine 225 loads and manages the execution of built-in vulnerability checks. These are checks that were created before the implementation of Internet Scanner's Plug-In/Built-in architecture. The primary difference between the two types of checks is that the built-in checks have resources that are embedded in the exploits, resulting in dependency.

Next, the internet scanner database 227 stores X-force vulnerability check information, scan results, and other data. This is an Open Database Connectivity (ODBC)-compliant database that makes data accessible for custom reports, corporate applications and other databases.

Lastly, internet scanner database 227 and risk assessment database 231 produce reports using Seagate® Crystal Reports™ on report environment 229. Reports are available in the following types: executive reports, line management reports, technician reports and user imported (or Custom) reports. Executive reports provide high-level summary information, including graphs, for rapid assessment of top-level security issues. These reports can be generated in a number of languages. These reports may be produced and/or printed on at least one printing device 130 in a humanly readable form.

Line management reports show details of network scans sorted by DNS Name, IP address, or operating system. These reports are designed to facilitate resource planning. Next, technician reports provide detailed information about network security status, including instructions on how to fix or patch the vulnerabilities detected by Internet Scanner. Finally, users can create custom (or user-imported) reports based on their own network and reporting needs. The user imported folder in the Internet Scanner installation directory is empty by default, and can be populated using the Import custom Report option from the Reports menu.

Risk assessment database 231 is operatively connected to Internet Scanner database 227. Alternatively, risk assessment database 231 may be an integral portion of Internet Scanner database 227, or vice versa. Likewise, the two databases may be combined into a single database. Risk assessment database 231 is able to provide additional information to Internet Scanner Database 227 in an effort to calculate vulnerabilities of a system that is submitted, as stated above, to report environment 229. Risk assessment database 231 may also have inputted therein information and data gathered from other methods, such as but not limited to a back office analysis, interviews with the different actors of the system or a physical walk through. The back office analysis, interviews with the different actors of the system and the physical walk through provides a disclosure of the different vulnerabilities of the system that may not be detected with an automated vulnerability scanner tool. These vulnerabilities may be inputted into the risk assessment database 231 through the user computer 101. Processor 103 is utilized to perform calculations on the data in the information database 231 to determine the overall risk value associated with the system, a component, or category or method, in accordance with the risk calculation method of this invention.

Each part or component of the system that is viewed, such as an entire system, a sub-system of the system, a server of the system and a physical means of transmission between hosts are taken into account by the back office analysis, interviews with different actors of the system, and the physical walk through. Therefore, these additional methods may be used to gather additional information, such as, for example, participation, that may be input into the databases and associated with components from which data is gathered by an automated vulnerability scanner.

All of the vulnerabilities identified in the risk assessment database 231 and the Internet Scanner database 227 may be grouped into several categories, such as, but not limited to, Organization and Roles, Norms, Execution Services and Storage Media.

Figure 9:
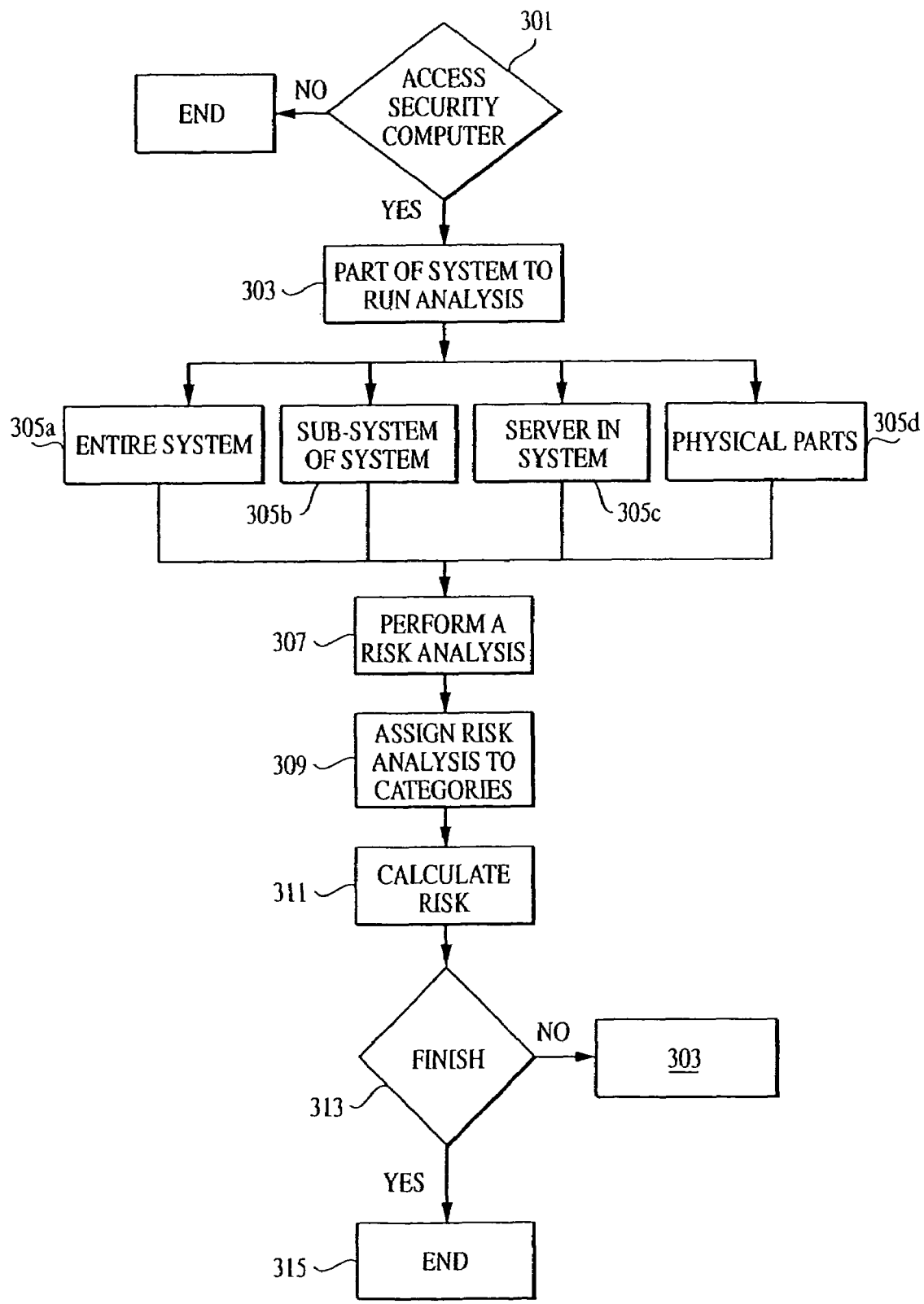
FIG. 9 is a flow chart illustrating a method for implementing the invention.

FIG. 9 is a flow chart illustrating a method for implementing the invention. This implementation may be referred to as a risk analysis process or risk analysis software program. This process or program is described with reference to the systems depicted in FIGS. 7 and 8.

This process or program is utilized to obtain various vulnerabilities for a computer or a system operatively connected to security computer 121. This information is gathered, analyzed in report environment 229 and used to compute a band risk calculation for each computer or element in the network. The report environment 229 may also generate and output on a user interface or a printer a report of the overall risk and other supporting information. At least one user through user computer 101 through an operative connection with at least one network 100 may be in communication with security computer 121.

To being the risk analysis process, in 301, the user computer 101 utilizes input device 111 by conventional means to obtain access to security computer 121. If the user computer 101 cannot obtain access to security computer 121, then the process ends. Security computer 121 may utilize a password from user computer 101 in order to enable user computer 101 to access security computer 121, where the user computer 101 may not have the authorized password to access security computer 121. Those of ordinary skill in the art recognize that there may be other methods utilized to allow user computer 101 to access security computer 121.

If user computer 101 is able to access security computer 121, then in 303, user computer 101 may decide which aspect or component of a system that user computer 101 wants to run a risk analysis. The component may be, for example, an entire system 305*a*, a sub-system of the system 305*b*, a server of the system 305*c*, or a physical means of transmission between hosts 305*d*. In 307, user computer 101 has decided the component for which the risk analysis software program will be utilized.

For example, the user computer 101 may choose to run a risk analysis on the component such as a server of the system 305*c*. In 309, security computer 121 utilizes risk assessment database 231 in conjunction with internet scanner database 227 to perform a risk analysis on the server of the system 305*c* to compute a risk value, as described above. In addition, user computer 101 may utilize the risk assessment database 231 on mass storage device 109 in conjunction with internet scanner database 227 on security computer 121 to run a risk analysis to compute a risk value. The risk value or vulnerability may be put into one or more categories such as, Organization Roles, Norms, Execution Services and Storage Media. Each risk value calculated for a vulnerability is assigned to at least one severity band on a risk echelon, as described above.

Once the risk value is put into one or more categories, then an overall risk or at least one risk may be calculated in 311, as described above. In this risk analysis process or risk analysis software, the overall risk may be calculated by calculating a risk value for each individual component or for any combination of components. When the overall risk is calculated, as described above, then the user computer 101 may choose to end this program 315 or to continue calculating vulnerabilities or risk values for each individual component or any combination thereof at 303.

Figure 10:
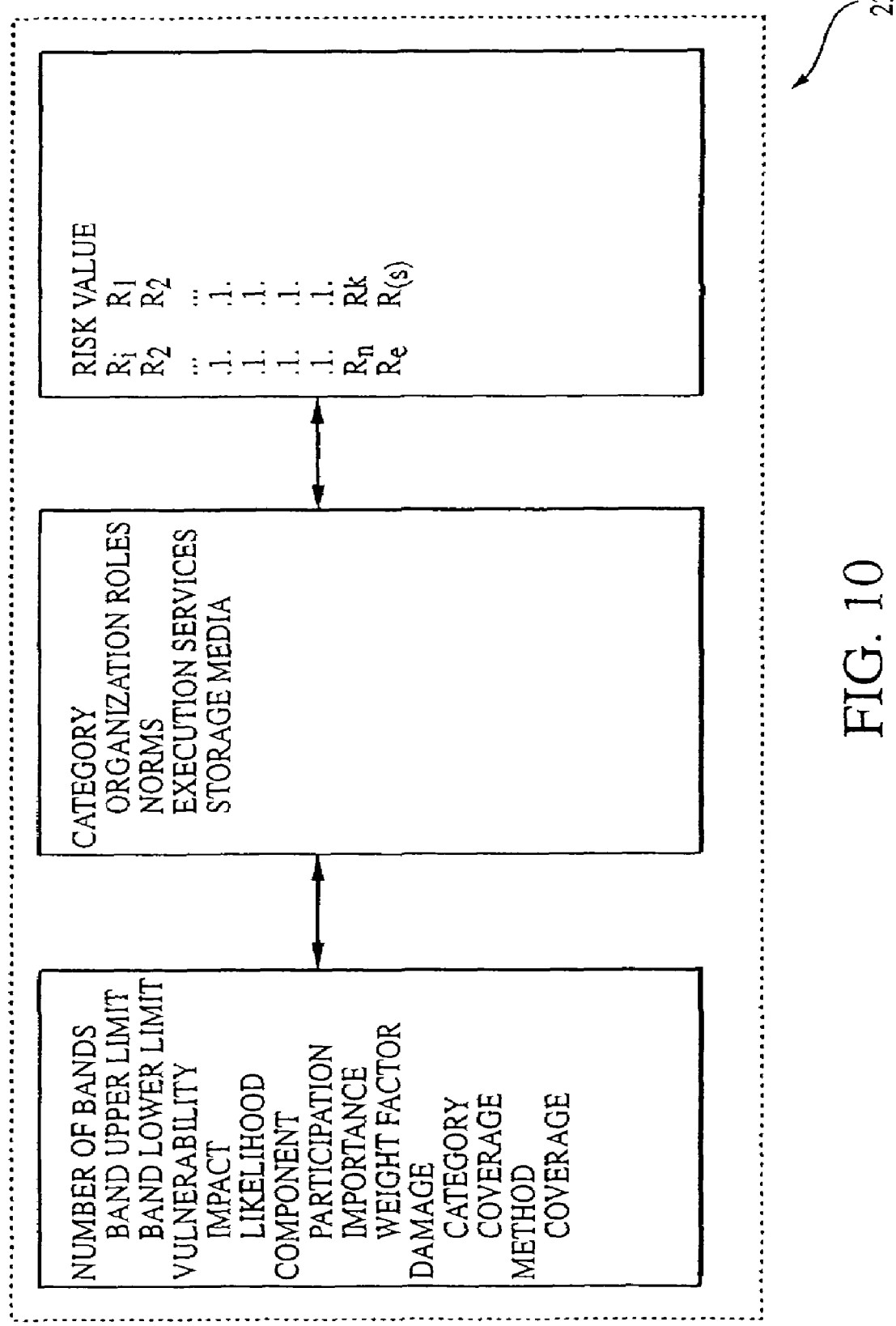
FIG. 10 is a representation of a data structure of the risk assessment database.

In an example shown in Table 2 below, there is a description of the possible outcome of a risk analysis for a system such as computer or a network of computers. The levels of Risks are defined at R1, R2 and R3 at different risk levels. For each risk level, there is a certain amount of vulnerability that is detected for each method, which may be input into a risk assessment database as shown in FIG. 10. R1 utilizes a back office analysis method to show that there is a high risk vulnerability for the sub-system of the system that is in the Norms category. In addition, R2 utilizes an interview with different actors of the system method to show that there is a medium risk vulnerability for the server of the system that is in the Execution services category. Next, R3 utilizes an automated vulnerability detection tool, or alternatively, a physical walk through method, to show that there is a low risk vulnerability for the entire system that is in the Storage media category. Once the various risk values for each component are detected, then the risk values can be utilized to calculate the overall risk for each category, for each portion of the system, for any component of the system or any combination thereof.

TABLE 2

| Upper Band Limit | Vulnerability | Risk Category | Component | Method |
|---|---|---|---|---|
| R1 = 1.0 | High Risk | Norms | Sub-system of the system | Back-Office analysis |
| R2 = 0.7 | Medium Risk | Execution Services | Server in the system | Interview with different actors of the system |
| R3 = 0.3 | Low Risk | Storage Media | The entire system | Automated vulnerability scanner or Physical walkthrough |

FIG. 10 is a representation of a data structure 233 of the risk assessment database 231. In this representation, based on the associations of band severity levels, category, participation, method and risk value, a data structure may be produced, which is preferably stored in the risk assessment database 231. Alternatively, the data structure may be provided on the internet scanner database 227, report environment 229, or any other memory storage device, as preferred by the user. These two databases 227 and 231 are in communication and are utilized to produce a printed reported in reporting environment 229. The data structure 233 provides in at least one tangible computer-readable medium a database from the risk analysis program that may be utilized to obtain an understanding of the vulnerabilities, categories, methods, risk values etc. associated with a computer network system.

Based on the risk assessment and overall risk value calculated, one can implement changes to the system architecture; protocols, procedures and organizational roles and responsibilities to eliminate or downgrade risks, in particular those risks that have greatest impact on the overall risk to the Component or System.

Some of the changes that can be implemented include those related to user access and password security, such as, but not limited to the following: Implement shadow password files on all servers. Develop a procedure to allow users to change their password on their own. Write and enforce a policy on the use of good passwords. Run utilities like "Crack" periodically to check password strength. Implement password checking programs within applications to verify strength of passwords. Configure systems and application for password aging, limit unsuccessful login attempts and document password policies. Review and maintain the access rights strictly to what the user need. Implement inactivity timers for accounts, applications and databases. Develop a policy for inactivity timers.

Other changes may relate to establishing firewalls and other gates, such as, but not limited to, the following: (1) implement a strong authentication mechanism for access to servers to identify clients, which may be put in place for every entity accessing a certain network; (2) establish an encryption mechanism or implement a Virtual Private Network between two systems or one group of users and servers to protect from eavesdropping; (3) implement a firewall to protect external connections to certain systems and enable Network translation, which will hide the internally used IP-addresses; (4) install a strong authentication mechanism; (5) modify the application design to allow different ports for internal users and others; (6) protect the port dedicated to internal users with a firewall; and (7) restrict the access rights on the port dedicated to others.

Other changes may relate to establishing security procedures and effective oversight by a security administrator, such as, but not limited to the following: (1) develop roles and responsibilities descriptions for security functions (Security Administrator), and clearly assign each role to an appropriate individual; (2) review roles periodically with each person; (3) set up system administrator procedures that may include guidelines for monitoring industry publications for new security vulnerabilities and fixes; (4) develop and distribute clients' users' education material; and (5) create a legal disclaimer and Security FAQs linked on Log-in Page.

Still other changes may relate to engaging in regular system monitoring, such as, but not limited to, the following: (1) create and enforce compliance monitoring procedures; (2) use Tivoli or other software tools to support monitoring and to search system logs for suspicious patterns; (3) check the respect of the security policy; (4) notice any abnormal event and any intrusion attempts. These additional practices may be included in standard administration procedures, such as, but not limited to the following: (1) monitor user home directories for use of .rhosts and .netrc and remove these files; (2) write and enforce policy on use of .rhosts and .netrc files; (3) disable rcp and use ftp to back up certain data; (4) make use of warning message in every services and application accessed by the users; and (5) put an awareness policy in place.

While this invention has been shown and described in connection with the embodiments described, it is apparent that certain changes and modifications, in addition to those mentioned above may be made from the basic features of this invention. In addition, there are many different types of computer systems, and computer software and hardware, and security tools that may be utilized in practicing the invention, and the invention is not limited to the examples given above. Accordingly, it is the intention of the applicants to protect all variations and modifications within the valid scope of the present invention. It is intended that the invention be defined by the following claims, including all equivalents.

What is claimed is:

1. A computer-implemented method for assessing a single value representative of an overall risk in at least part of an information technology system comprising:
 inputting into a risk assessment database a plurality of risks for an information technology system by utilizing at least one computer having a risk analysis program, wherein each of the risks represent a security vulnerability for the information technology system;
 associating the plurality of risks with at least one severity band in a risk echelon and storing said association in a memory storage device;
 assigning a risk value to each of the plurality of risks that represents a value of danger associated with the risk;
 for each of the plurality of risks, assigning a risk rank to the risk that indicates the magnitude of the risk value assigned to the risk;
 determining, with the risk analysis program stored on the at least one computer, a band limit value for the at least one severity band, wherein the band limit value indicates a risk limit value for the risk values associated with the at least one severity band;
 for each of the plurality of risks, determining, with the risk analysis program stored on the at least one computer, a corresponding coefficient factor based on the assigned risk rank and the band limit value for the at least one severity band associated with the risk, each coefficient factor having a decreasing magnitude from a coefficient factor corresponding to a highest risk value to a coefficient factor corresponding to a lowest risk value;
 summing, with the risk analysis program stored on the at least one computer, each of the corresponding coefficient factors together to determine a coefficient factor summation;
 multiplying, with the risk analysis program stored on the at least one computer, the coefficient factor summation with a risk multiplicand to determine a risk product, wherein the risk multiplicand is defined as $$\frac{r_{i_{max}} - r_{i_{max}-1}}{r_{i_{max}} + r_{i_{max}-1}},$$

wherein:
 $r_{i_{max}}$ is an upper band limit;
 $r_{i_{max}-1}$ is a lower band limit;

adding, with the risk analysis program stored on the at least one computer, the risk product to a risk addend to determine the overall risk, where the risk addend is defined as $r_{i_{max}-1}$ and, outputting an indication of the overall risk.

2. The method according to claim 1 wherein the value assigned to each risk is the mean value of the at least one severity band in which the risk is assigned.

3. The method according to claim 1 wherein the corresponding coefficient factor for each risk is smaller for risks in bands of lower severity.

4. The method according to claim 3 wherein the corresponding coefficient factors are determined such that the overall risk value does not exceed the upper risk value of the highest severity band containing a risk.

5. The method of claim 1, further comprising identifying a modification to the information technology system based on the overall risk.

6. The method of claim 5, wherein the modification comprises at least one of system architecture, security protocol, security procedure, and organizational responsibility.

7. A computer-implemented method for identifying an overall risk in at least part of an information technology system comprising:
(a) identifying a plurality of individual risks for an information technology system, wherein each of the risks represent a security vulnerability for the information technology system;
(b) associating, with a risk analysis program stored on a computer, each of the plurality of individual risks with a corresponding severity risk band in a risk echelon; and
(c) determining, with the risk analysis program stored on the computer, an overall risk according to:
determining a mean risk value of the highest severity risk band containing a risk; and,
for each risk in the highest severity risk band, adding an incremental risk value to the mean risk value;
wherein:
the incremental risk value is determined according to an associated risk band for each of the individual risks of the risk echelon and a rank of each of the individual risks in the risk echelon.

8. The method according to claim 7 further comprising identifying a modification to the information technology system according to the overall risk.

9. The method of claim 8, wherein the modification comprises at least one of system architecture, security protocol, security procedure, and organizational responsibility.

10. A computer-implemented method for assessing a risk in at least part of an information technology system comprising:
(a) inputting into a memory storage device an association of a plurality of risks identified in the information technology system to at least one corresponding severity band in a risk echelon by utilizing at least one computer having a risk analysis program, wherein each of the plurality of risks represent a security vulnerability for the information technology system;
(b) adding to an initial overall risk value a value of one half of the difference between an upper limit of a highest severity band containing a risk and the initial overall risk value to determine, with the risk analysis program stored on the at least one computer, an intermediate overall risk value, the initial overall risk value being a lower limit of the highest severity band containing a risk;
(c) for each additional risk in the highest severity band containing a risk, using the risk analysis program stored on the at least computer to add successively one-half of the difference between the upper limit of the highest severity band containing a risk and the intermediate overall risk value to re-determine the intermediate overall risk value, and assign a most recent risk from the highest severity band used to re-determine the intermediate overall risk value as a final risk;
(d) for each additional risk in bands having a severity less than the severity of the highest severity band containing a risk, adding in series a proportioned value of one half of a difference between the upper limit of the highest severity band containing a risk and the intermediate overall risk value, wherein one-half of the difference is proportioned by a coefficient factor relative to the highest risk value, to re-determine the intermediate overall risk value with the risk analysis program and assigning the most recent risk from the bands having a severity less than the severity of the highest severity band containing a risk used to re-determine the intermediate overall risk value as the final risk; and
(e) assigning the intermediate overall risk value determined for the final risk as the overall risk value for the system.

11. The method according to claim 10 wherein the coefficient factor is proportional to a selected risk value of the band containing the risk to which the factor is applied divided by a selected risk value of the highest severity band.

12. The method according to claim 11 wherein the selected risk value of the band containing the risk to which the factor is applied is the mean risk value of that band, and the selected risk value of the highest severity band is the mean risk value of said highest severity band.

13. The method according to claim 10 further comprising identifying the plurality of risks according to network penetrations tests by utilizing the risk analysis program.

14. The method of claim 10, further comprising identifying a modification to the information technology system according to the overall risk.

15. The method of claim 14, wherein the modification comprises at least one of system architecture, security protocol, security procedure, and organizational responsibility.

16. A computer-implemented method for assessing the overall risk in an information technology system comprising:
utilizing a risk analysis program stored on at least one computer to enter into a memory device a plurality of risks in a system, wherein each risk is associated with a component, category or method of the system;
associating the risks with at least one severity band in a risk echelon and storing said associations in the memory device;
assigning a numerical value to each risk utilizing the at least one computer having the risk analysis program;
determining, with the risk analysis program stored on the least one computer, a band limit value for the at least one severity band that indicates a risk limit value for the numerical value assigned to each risk associated with the at least one severity band;
determining, with the risk analysis program stored on the at least one computer, a coefficient factor for each of the risks, wherein the coefficient factor is determined based on the band limit value of the associated severity band for the assigned risk value and a rank of the risk within the at least one severity band, each coefficient factor having a decreasing magnitude from a coefficient factor corresponding to a highest numerical value to a coefficient factor corresponding to a lowest numerical value;

summing, with the risk analysis program stored on the at least one computer, each of the coefficient factors associated with said one of a component, category or method together to determine a coefficient factor summation;

multiplying, with the risk analysis program stored on the at least one computer, the coefficient factor summation with a risk multiplicand to determine a risk product, wherein the risk multiplicand is defined as $$\frac{r_{i_{max}} - r_{i_{max}-1}}{r_{i_{max}} + r_{i_{max}-1}},$$

wherein;
$r_{i_{max}}$ is an upper band limit;
$r_{i_{max}-1}$ is a lower band limit;
adding, with the risk analysis program stored on the at least one computer, the risk product to a risk addend to determine the overall risk in the system for the said one of a component, category or method, where the risk addend is defined as $r_{i_{max}-1}$ and,
outputting an indication of the overall risk for the said one of a component in a humanly readable form.

17. The method according to claim 16:
wherein the overall risk determined by the method of claim 16 is an overall risk in the system for a component; and further comprising:
determining a component overall risk for each component in the system, wherein each component overall risk is an overall risk in the system for the component;
multiplying each component overall risk by a participation factor to determine a plurality of factored component overall risks, wherein the participation factor represents the component participation of the component corresponding to the component overall risk;
placing each of the plurality of factored overall risks into a risk echelon; and
calculating an overall risk of the system based on the factored overall risks in the risk echelon.

18. The method of claim 17 further comprising:
determining an overall average coverage for a category by, when given a plurality of methods for identifying risks and a plurality of weight factors, wherein each weight factor corresponds to a method of the plurality of methods:
for each method, calculating a weighted coverage of the system in the category for the method by multiplying a coverage of the system in the category for the method with the weight factor corresponding to the method, wherein the weight factor represents an importance of the method for the category;
calculating a weighted coverage summation numerator by adding each of the weighted coverages together;
calculating weight summation denominator by adding each of the weight factors of the plurality of weight factors together; and
dividing the weighted coverage summation numerator by the weight summation denominator.

19. The method according to claim 18 further comprising:
determining an overall average coverage of the system by, for a plurality of categories, calculating a sum of all of the overall average coverages per category weighted with an importance coefficient factor of the category, and dividing the sum of the weighted coverages per category by a sum of the importance coefficient factors.

20. The method of claim 16, further comprising:
identifying a modification to at least any one of the system architecture, security protocol, security procedure, and organizational responsibility.

21. A system for conducting a risk assessment of a computer network system, the system comprising:
at least one risk assessment database for storing risk assessment information associated with the computer network system, the risk assessment information being recorded in the risk assessment database through user input;
at least one internet scanner database for storing risk assessment information associated with the computer network system and being generated by an automated vulnerability scanner, the at least one internet scanner database being configured to share computer network system risk information with the at least one risk assessment database for analysis of a vulnerability of the computer network system;
a processor for determining an overall risk value associated with at least one component associated with the computer network system according to information in the internet scanner database and the at least one risk assessment database and computer network information, wherein the overall risk value is determined according to:

$$R = r_{i_{max}-1} + \frac{r_{i_{max}} - r_{i_{max}-1}}{r_{i_{max}} + r_{i_{max}-1}} \times \sum_{k=1}^{\|R\|} \left[ \frac{r_{i(m_k)-1} + r_{i(m_k)}}{2^k} \right],$$

$r_{i_{max}}$ is an upper band limit;
$r_{i_{max}-1}$ is a lower band limit;
$m_k$ is a risk assigned a rank k;
$i(m_k)$ is a severity band of the risk assigned the rank k;
$r_i$ is an upper band limit for the severity band i;
$\|R\|$ is a total number of risks; and,
R is the overall risk value;
a user computer for inputting risk assessment information to and for receiving risk assessment information from said risk assessment database; and
an interface for displaying said overall risk value determined by said processor.

22. The system of claim 21 further comprising an automated vulnerability scanner tool in communication with said internet scanner database to populate said internet scanner database with risk assessment information.

23. The system of claim 22, wherein said interface displays visual representation of individual risk values of vulnerabilities in the computer network system based on relative contribution to overall risk.

24. The system of claim 21, wherein the risk assessment database includes information from at least one of a back office analysis, interviews with different actors of the computer network system and a physical walk through.

25. The system of claim 21, wherein the at least one component is a server associated with the computer network system.

* * * * *

UNITED STATES PATENT AND TRADEMARK OFFICE
CERTIFICATE OF CORRECTION

PATENT NO. : 7,613,625 B2
APPLICATION NO. : 10/984057
DATED : November 3, 2009
INVENTOR(S) : Nicolas Heinrich It is certified that error appears in the above-identified patent and that said Letters Patent is hereby corrected as shown below:

In column 10, line 14, after "of a Risk" replace "R(V,C)" with --$R_{(V,C)}$--.

In column 10, line 15, before "the corresponding band will" replace "i(V,C). Thus," with --$i_{(V,C)}$. Thus,--.

In column 10, line 55, to column 11, line 9, replace the entire equation as follows.

$$i_{max} = 2$$

$$\|V_C\| = 2 + 4 = 6$$

$$R(C) = r_{i_{max}-1} + \frac{r_{i_{max}} - r_{i_{max}-1}}{r_{i_{max}} + r_{i_{max}-1}} \times \sum_{k=1}^{\|V_C\|} \left[ \frac{r_{i(V_k,C)-1} + r_{i(V_k,C)}}{2^k} \right]$$

$$R(C) = r_1 + \frac{r_2 - r_1}{r_2 + r_1} \times \sum_{k=1}^{6} \left[ \frac{r_{i(V_k,C)-1} + r_{i(V_k,C)}}{2^k} \right]$$

$$R(C) = 0.3 + \frac{0.7 - 0.3}{0.7 + 0.3} \times \left[ \frac{0.7 + 0.3}{2} + \frac{0.7 + 0.3}{4} + \frac{0.3 + 0}{8} + \frac{0.3 + 0}{16} + \frac{0.3 + 0}{32} + \frac{0.3 + 0}{64} \right]$$

$$R(C) = 0.63$$

Signed and Sealed this
Twenty-second Day of February, 2011

David J. Kappos
*Director of the United States Patent and Trademark Office*